(12) United States Patent
Ludwick

(10) Patent No.: US 7,644,971 B1
(45) Date of Patent: Jan. 12, 2010

(54) EXPANDABLE MOTOR HOME

(76) Inventor: Eric Ludwick, 54578 Sagewood Dr., Mishawaka, IN (US) 46545

( * ) Notice: Subject to any disclaimer, the term of this patent is extended or adjusted under 35 U.S.C. 154(b) by 18 days.

(21) Appl. No.: 11/780,142

(22) Filed: Jul. 19, 2007

(51) Int. Cl.
*B60P 3/34* (2006.01)

(52) U.S. Cl. ................... 296/26.02; 296/26.13

(58) Field of Classification Search ............. 296/26.02, 296/171, 26.12, 26.01, 26.04, 26.13; 52/79.5
See application file for complete search history.

(56) References Cited

U.S. PATENT DOCUMENTS

| | | | |
|---|---|---|---|
| 2,739,833 A | | 3/1956 | Schenkel et al. |
| 2,862,759 A | | 12/1958 | Huth |
| 3,596,416 A | | 8/1971 | Hojka |
| 3,850,470 A | | 11/1974 | Trelle |
| 3,941,414 A | | 3/1976 | Platt |
| 4,930,837 A | | 6/1990 | Marsh et al. |
| 4,958,874 A | | 9/1990 | Hegedus |
| 5,154,469 A | | 10/1992 | Morrow |
| 5,374,094 A | * | 12/1994 | Smith et al. ............. 296/26.05 |
| 5,785,373 A | * | 7/1998 | Futrell et al. ............. 296/26.01 |
| 5,787,650 A | * | 8/1998 | Miller et al. ............. 296/171 |
| 5,915,774 A | * | 6/1999 | Tiedge ............. 296/26.13 |
| 5,967,583 A | * | 10/1999 | Wishart ............. 296/156 |
| 6,098,346 A | * | 8/2000 | Miller et al. ............. 296/171 |
| 6,135,525 A | | 10/2000 | Amann |
| 6,224,126 B1 | * | 5/2001 | Martin et al. ............. 296/26.01 |
| 6,302,475 B1 | * | 10/2001 | Anderson ............. 296/175 |
| 6,619,714 B2 | * | 9/2003 | Schneider et al. ............. 296/26.13 |
| 6,644,719 B2 | * | 11/2003 | Young, Sr. ............. 296/165 |
| 6,692,062 B1 | | 2/2004 | Woodard et al. |
| 6,712,414 B2 | | 3/2004 | Morrow |
| 6,722,726 B1 | | 4/2004 | Parmer |
| 6,729,678 B1 | * | 5/2004 | Atcravi ............. 296/168 |
| 6,755,460 B1 | * | 6/2004 | Marrs et al. ............. 296/187.12 |
| 7,017,975 B2 | | 3/2006 | Parmer |
| 7,150,483 B2 | * | 12/2006 | Rasmussen ............. 296/26.14 |
| 7,226,116 B2 | * | 6/2007 | Jones ............. 296/175 |
| 7,234,747 B2 | * | 6/2007 | Rasmussen ............. 296/26.01 |
| 7,469,949 B2 | * | 12/2008 | Harder ............. 296/26.13 |
| 2003/0085562 A1 | * | 5/2003 | Sparling ............. 280/789 |
| 2006/0131912 A1 | * | 6/2006 | MacLean ............. 296/26.13 |

FOREIGN PATENT DOCUMENTS

| | | |
|---|---|---|
| CA | 2180038 | 12/1997 |
| EP | 0 317 357 | 5/1989 |

* cited by examiner

*Primary Examiner*—Kiran B. Patel
(74) *Attorney, Agent, or Firm*—Botkin & Hall, LLP

(57) ABSTRACT

This invention relates to an expandable motor home. The motor home of this invention has a lower body portion having a first floor, a front wall, a back wall and a pair of opposite side walls. The motor home also has an upper body portion having a movable upper segment and a lower segment that is connected to the lower body portion. The lower segment has a front wall, a back wall and a pair of opposite side walls. The upper segment has a front wall, a back wall, a pair of opposite side walls, and a roof. The upper segment is movable relative to the lower segment such that the upper segment has a raised and lowered position relative to the lower body portion. The motor home may have extendable rooms in the upper segment and lower segment defining separate living areas.

9 Claims, 31 Drawing Sheets

EXPANDABLE MOTOR HOME

BACKGROUND OF THE INVENTION

The interior space of a motor home is limited by size restrictions on vehicles which use public roads. In the past to provide more interior room expandable sides were used to widen the motor home when it was parked. During travel down public roads the sides are retracted to meet size limits for use on public roads. The interior space of a motor home could be nearly doubled if a second story could be affixed to the top of commonly available motor homes. A fixed second story is not a viable option for traveling due to size restrictions and limited vehicle height available due to bridges.

SUMMARY OF THE INVENTION

This invention relates to an expandable motor home. The motor home of this invention has a lower body portion having a first floor, a front wall, a back wall and a pair of opposite side walls. The motor home also has an upper body portion that is disposed over the lower body portion. The body portion has an upper segment and a lower segment that is connected to the lower body portion. The lower segment has a front wall, a back wall and a pair of opposite side walls. The upper segment has a front wall, a back wall, a pair of opposite side walls, and a roof. The upper segment is movable relative to the lower segment such that the upper segment has a raised and lowered position relative to the lower body portion. An actuator is used to raise and lower the upper segment relative to the lower segment.

The motor home may have multiple floors defining separate living areas. The motor home may also have expandable rooms in the lower body portion which are slidingly retained within the lower body portion and provide additional room within the lower body portion.

Another embodiment includes an upper segment that accommodates upper extendable rooms that provide for lateral expansion. The upper expandable rooms are slidably retained within the upper segment, and move with the upper segment.

Another embodiment has extendable rooms in the upper segment and lower body portion. These rooms may be vertically aligned and extend simultaneously from the upper segment and lower body portion of the motor home.

Still another embodiment has extendable rooms that are joined together to without a floor between the roof and floor of the lower body portion. The joined rooms form a larger room that is expandable.

An object of the invention is to provide a motor home with multiple living areas.

Another object of the invention is to provide a motor home with an expandable top.

Another object of the invention is to make efficient use of space available in a motor home to maximize living space within the motor home.

Still other objects will become apparent upon reading the detailed description of the invention.

DETAILED DESCRIPTION OF INVENTION

Figure 1:
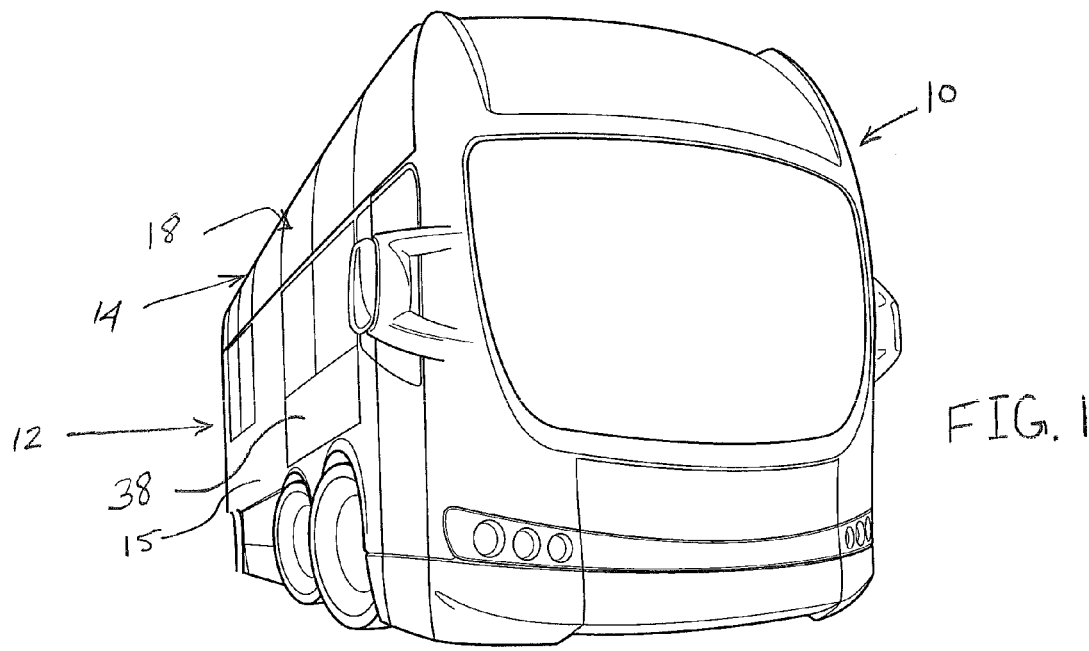
FIG. 1 is a perspective view of the first embodiment of the motor home of this invention.
Figure 2:
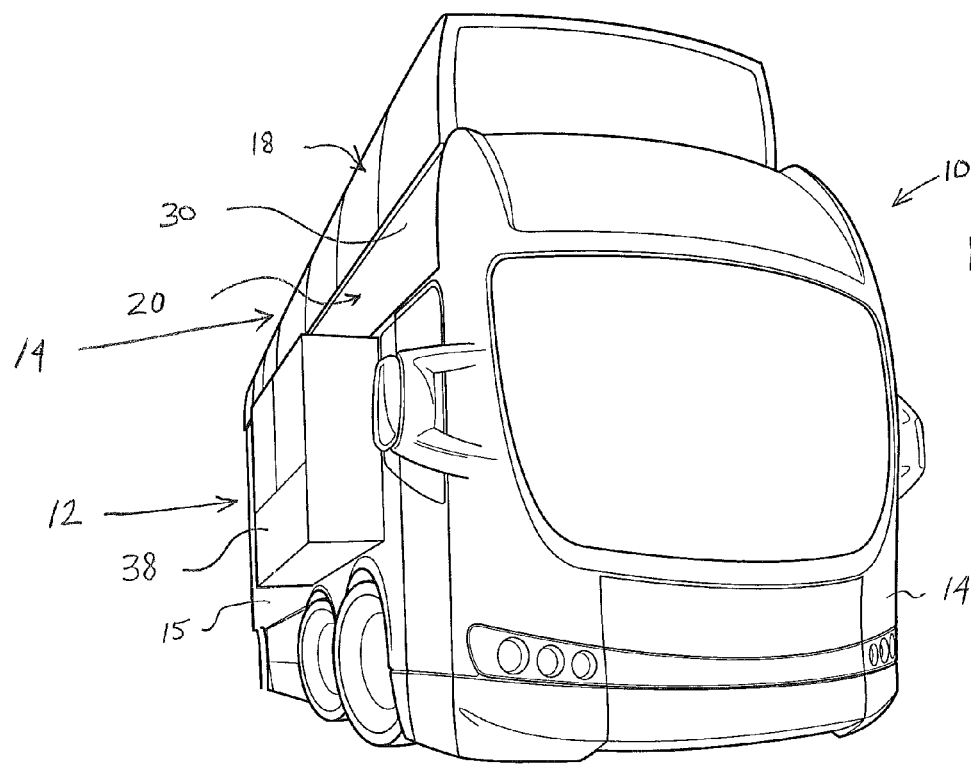
FIG. 2 is a perspective view of the motor home shown in FIG. 1 with the extendable rooms extended and the upper segment in its raised position.
Figure 3:
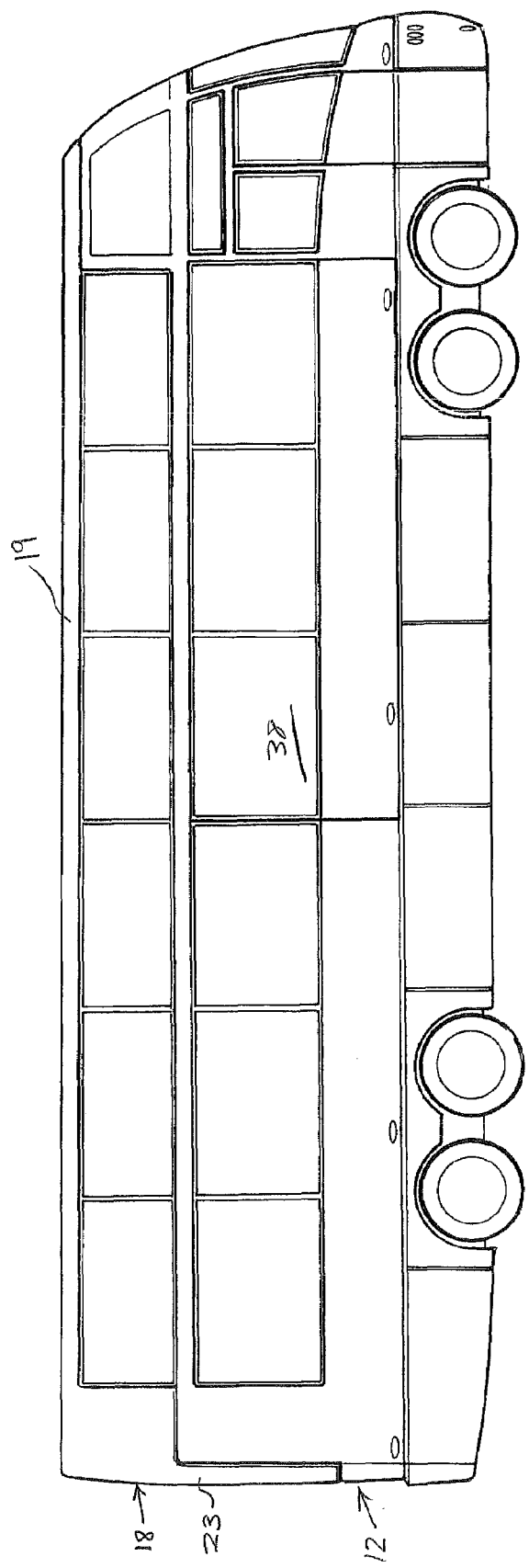
FIG. 3 is a side view of the motor home shown in FIG. 1.
Figure 4:
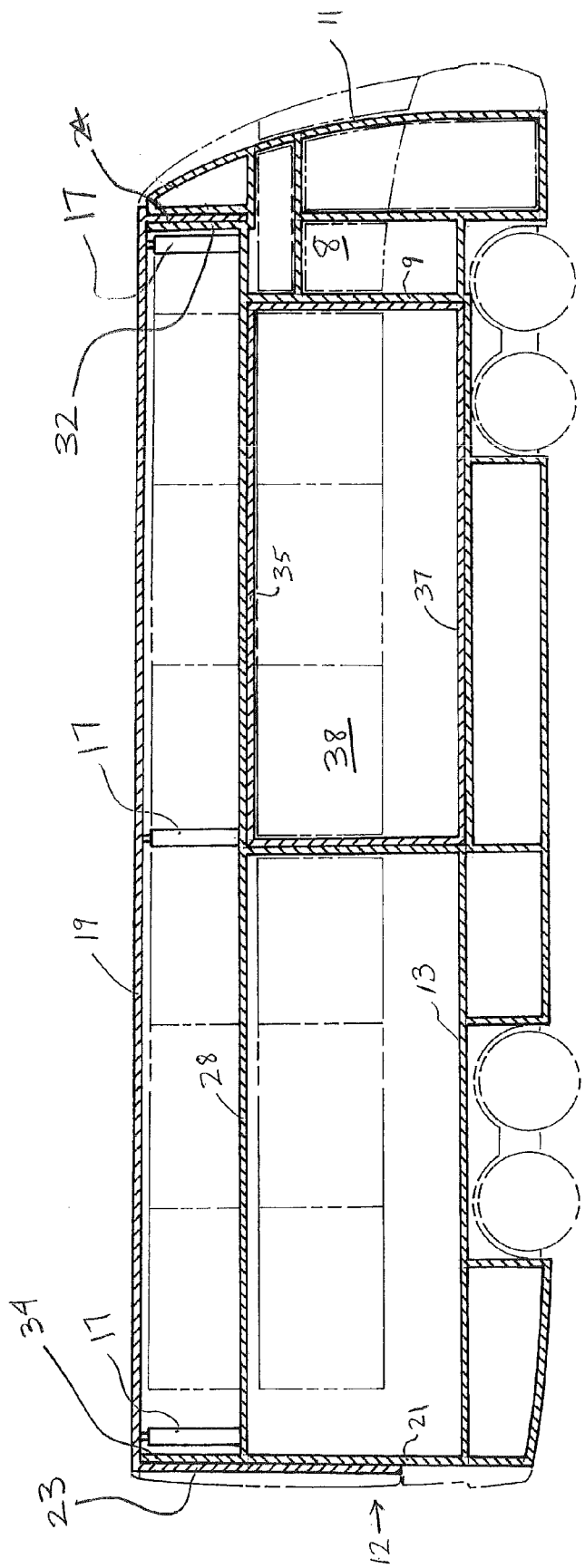
FIG. 4 is a sectional view through the side of the motor home shown in FIG. 3.
Figure 5:
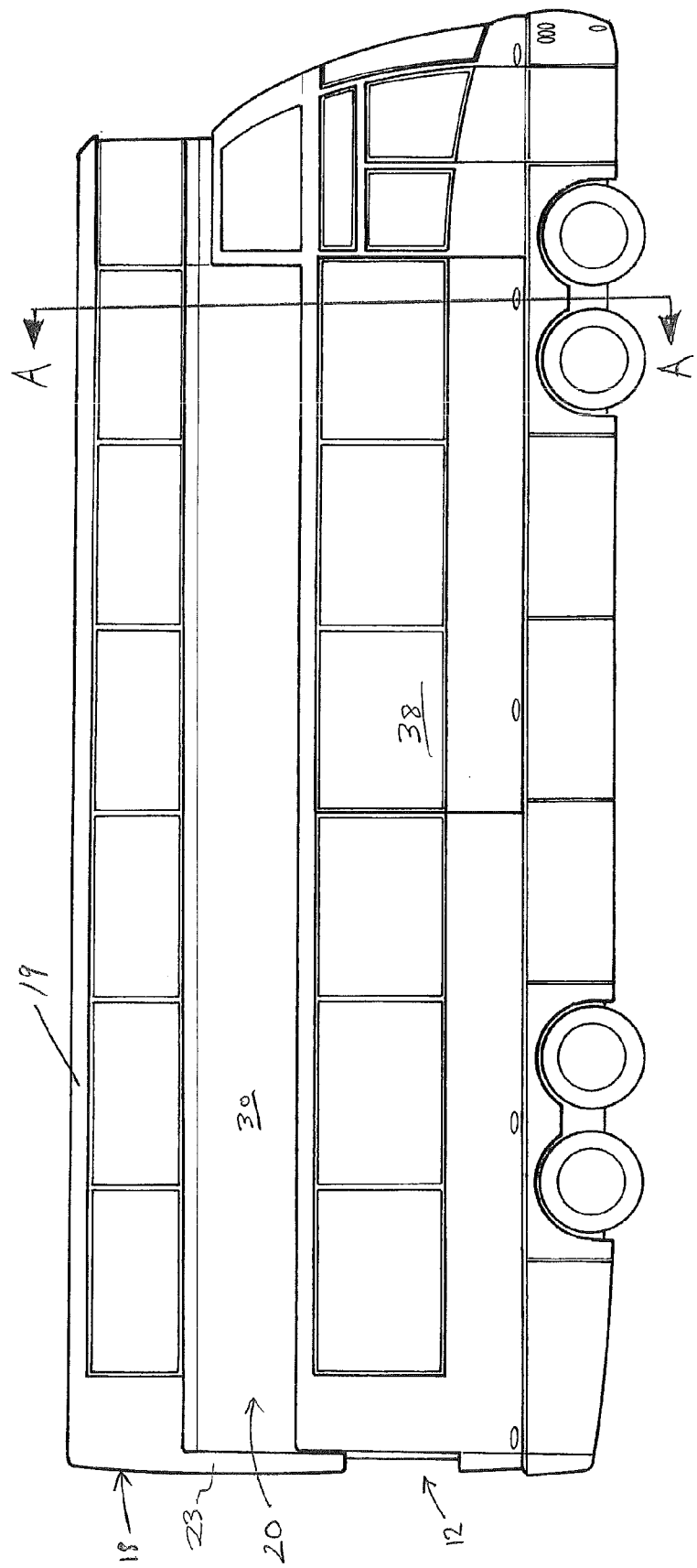
FIG. 5 is a side view of the motor home shown in FIG. 1 with the upper segment raised.
Figure 6:
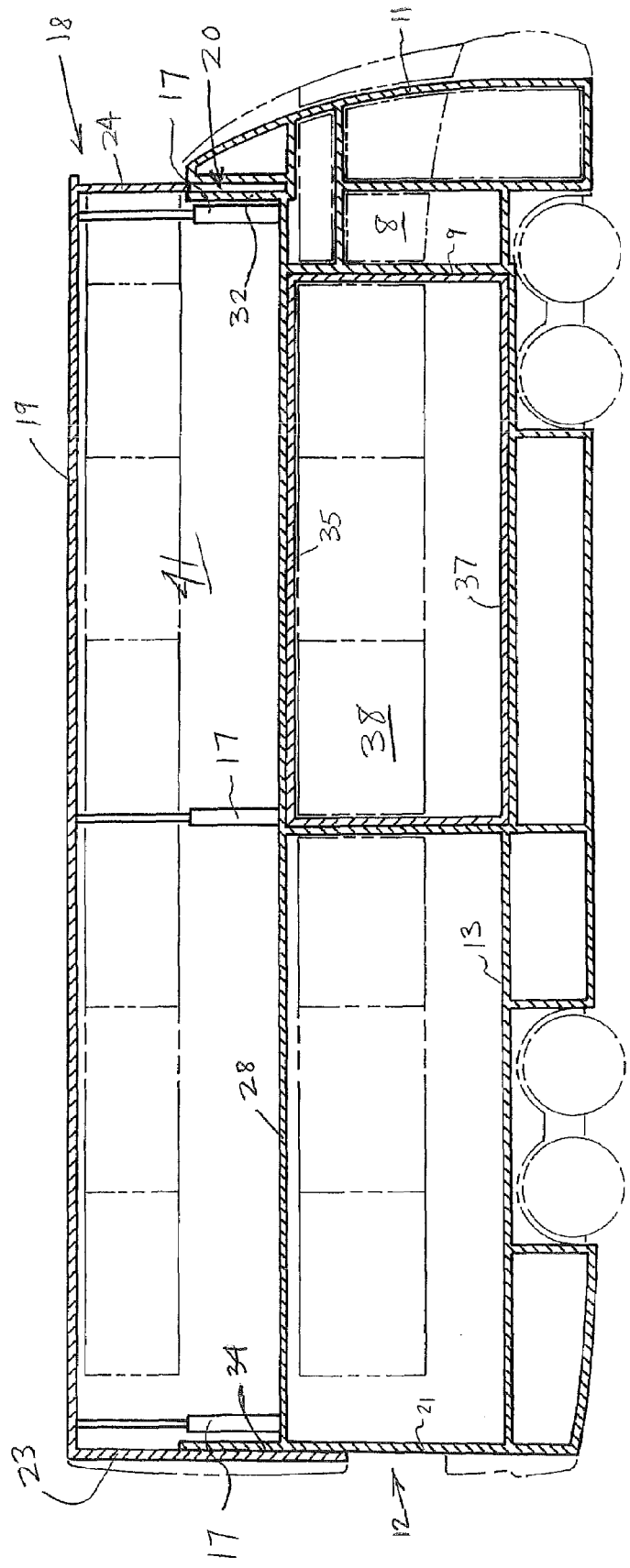
FIG. 6 is a sectional view of the motor home shown in FIG. 5 with the upper segment raised.
Figure 7:
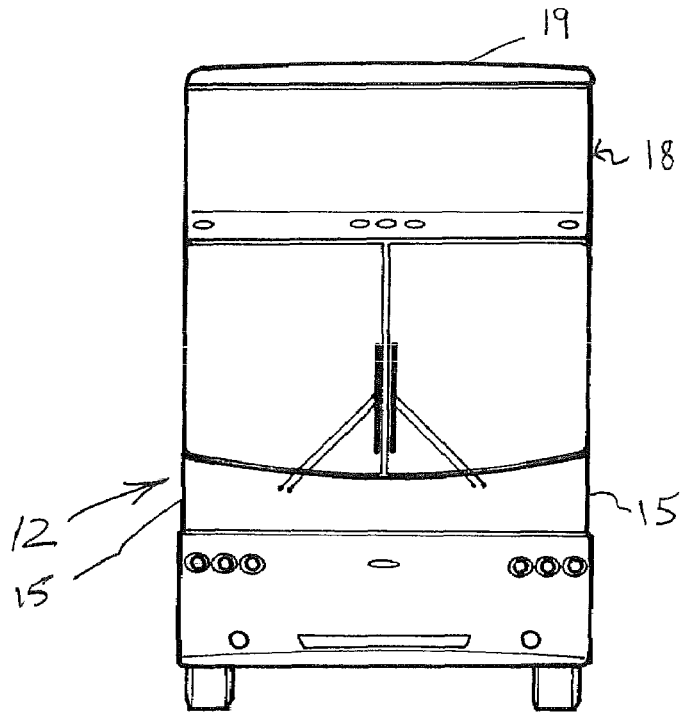
FIG. 7 is front view of the motor home shown in FIG. 1.

The expandable motor home 10 of this invention has a lower body portion 12 and an upper body portion 14 placed upon the lower body portion 12. The lower body portion 12 has a first floor 13, opposite side walls 15, a front wall 11, a back wall 21, a cab 8, and a back wall 9 of the cab 8. The upper body portion 14 has two sub components which are an upper segment 18 and a lower segment 20. The upper segment 18 has a roof 19, a front wall 24, a back wall 23, and a pair of opposite side walls 25. The lower segment 20 has a second floor 28, opposite side walls 30, a front wall 32, and a back wall 34. The lower segment 20 is fixed to the lower body portion 12. The upper segment 18 is movably engaged on the lower segment 20. Actuators, which may be hydraulic cylinders 17, are used to move the upper segment 18 from its fully lowered position. Although hydraulic cylinders 17 are shown, other actuators can be used to raise the upper segment 18. Such other actuators for raising the upper segment may include, but are not limited to, screw drives or rack and pinion assemblies. Typically there are at least four actuators near the corners of the upper body portion 14, but more can be used, if necessary. FIG. 4 shows the use of six hydraulic cylinders 17 used as actuators to lift the upper segment 18, three of the hydraulic cylinders 17 are shown in the sectional view.

Figure 8:
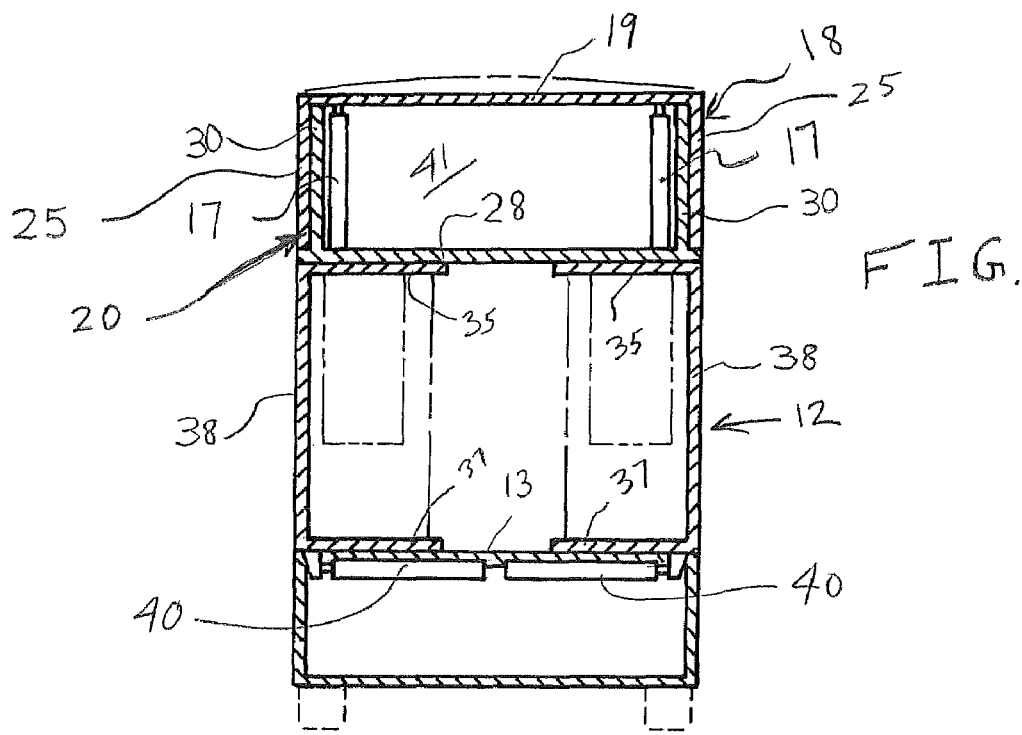
FIG. 8 is a sectional view of the motor home in FIG. 5 taken about the line A-A in FIG. 5.
Figure 9:
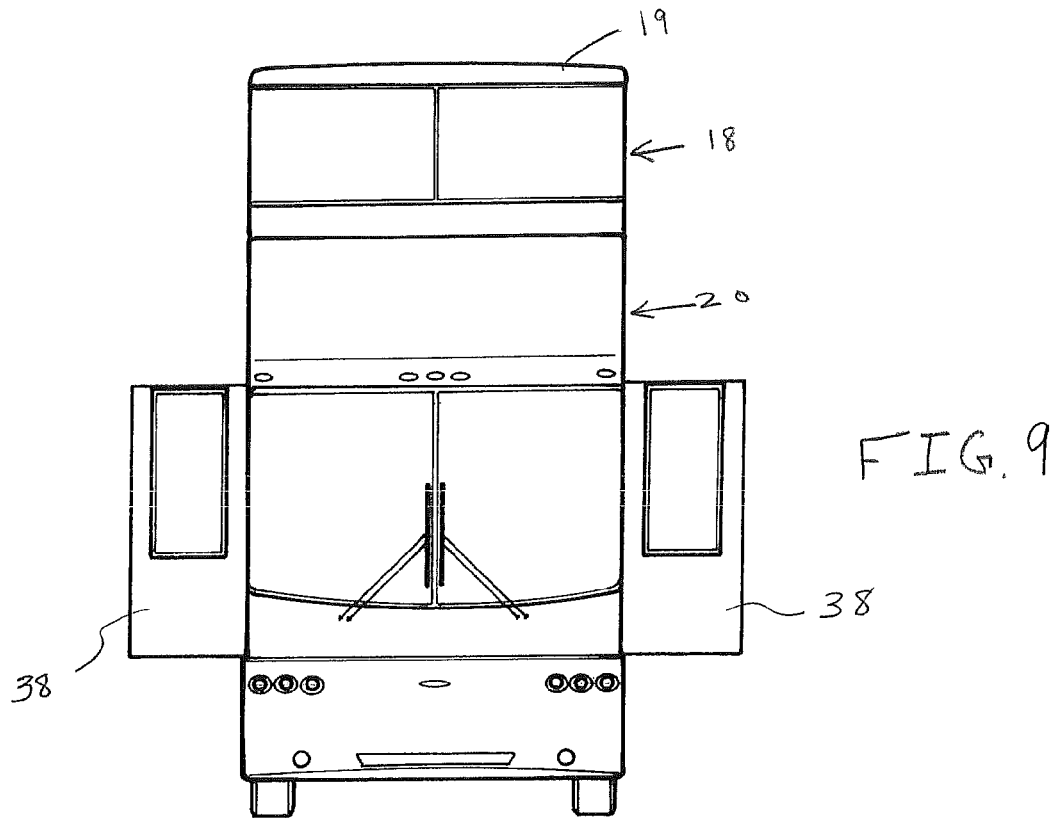
FIG. 9 is a front view of the motor home shown in FIG. 1 with the extendable rooms extended and the upper segment in its raised position.

The lower body portion 12 may include extendable rooms 38. These rooms are well known in the recreational vehicle art and may be moved in and out of a vehicle with the use of many different types of actuators. FIG. 8, shows the use of hydraulic cylinders 40 as actuators to move the extendable rooms 38, but actuators such as rack and pinion assemblies, or others may also be used.

First Embodiment

In a first embodiment, as shown in FIGS. 1-12, the side walls 25 of the upper segment 18 are continuous and do not accommodate extendable rooms. The side walls 15 of the lower body portion 12 in the first embodiment accommodate extendable rooms 38. The extendable rooms 38 each have a roof 35 and a floor 37 that slide within the lower body portion.

Figure 10:
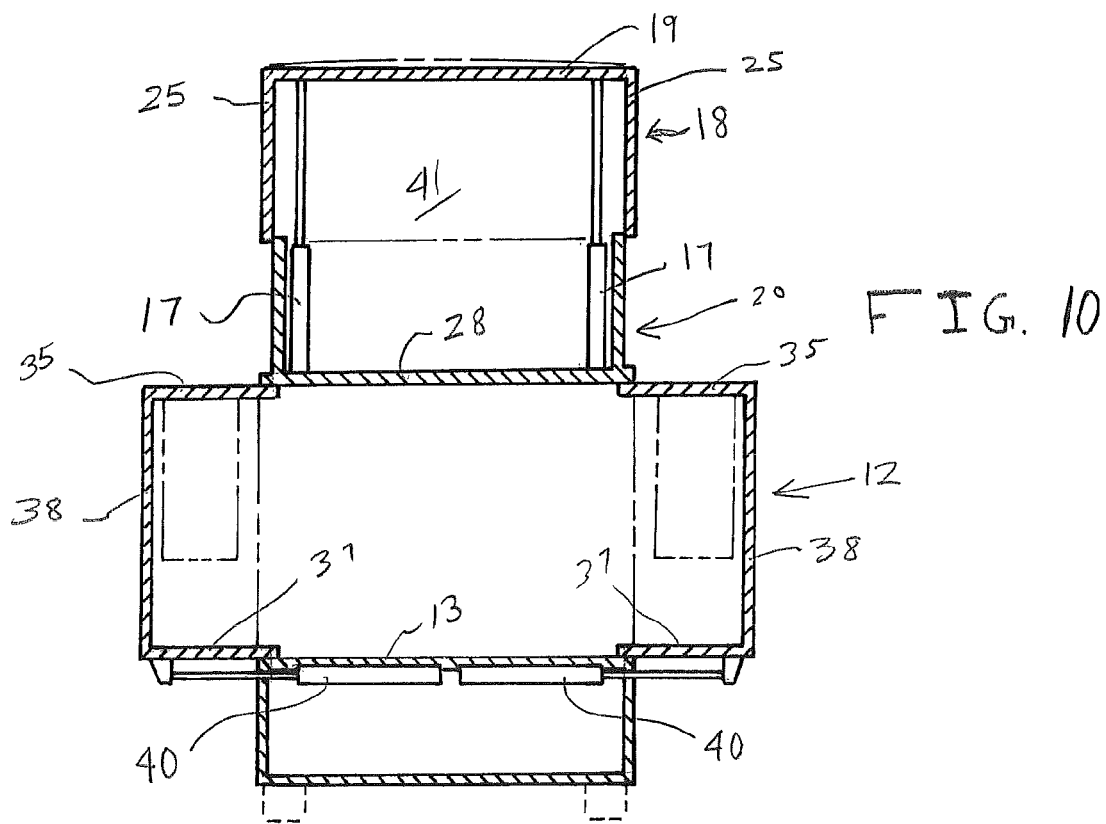
FIG. 10 is a sectional view of the motor home shown in FIG. 9 taken about the line A-A in FIG. 5.
Figure 11:
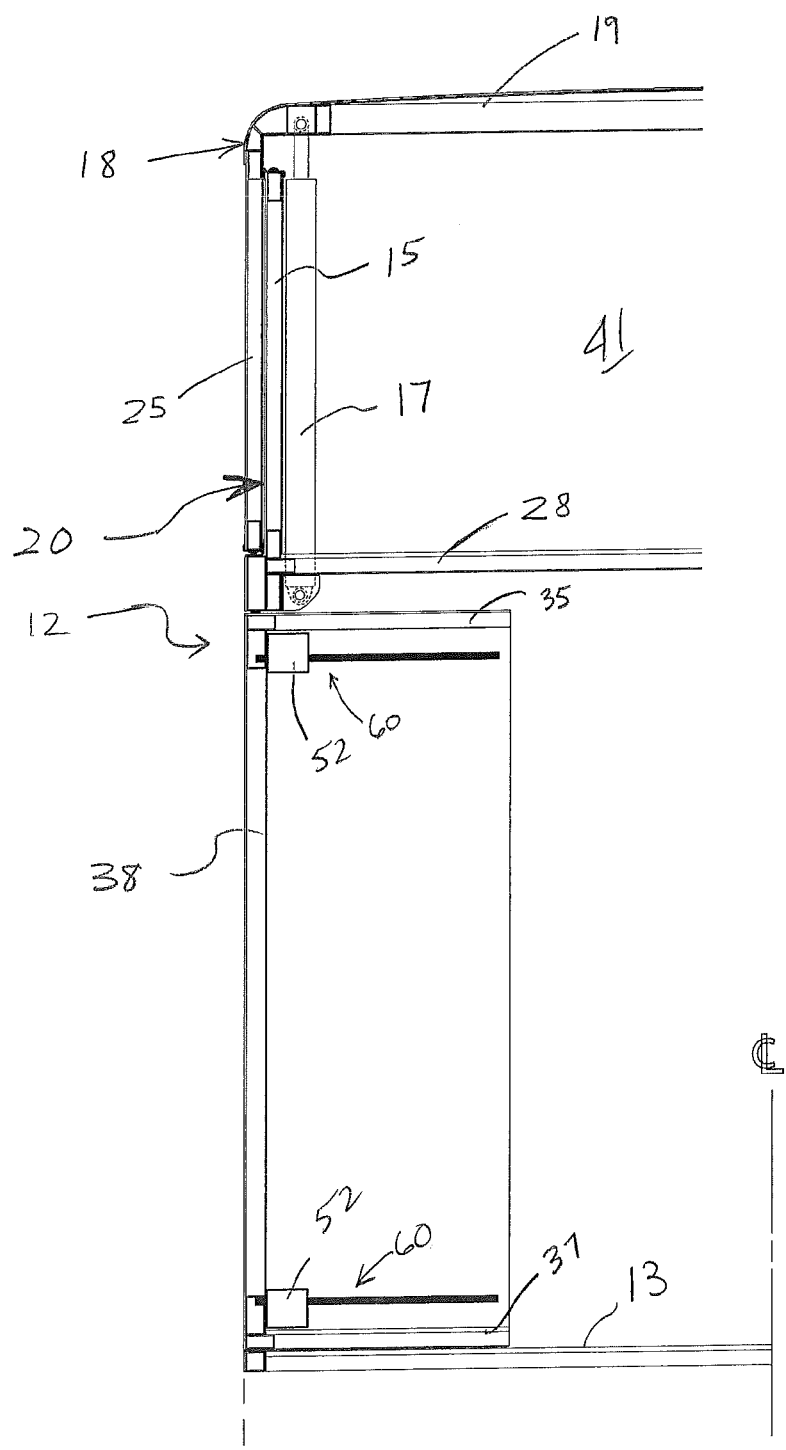
FIG. 11 is a detailed sectional view of the motor home taken about line A-A in FIG. 5 with the upper segment in its lowered position and the extendable room retracted.
Figure 12:
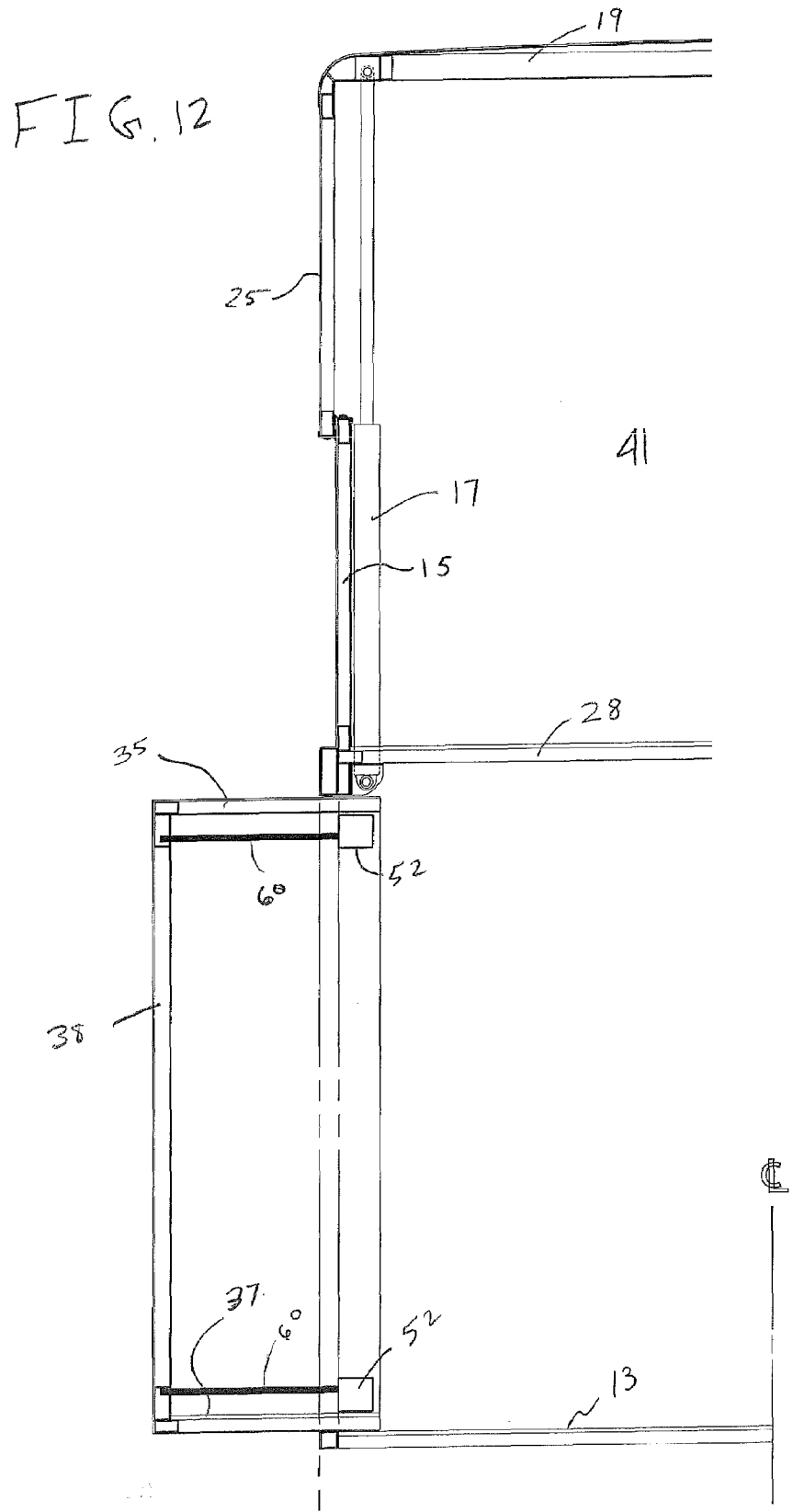
FIG. 12 is a detailed sectional view of the motor home taken about line A-A in FIG. 5 with the upper segment in its raised position and the extendable room extended.
Figure 13:
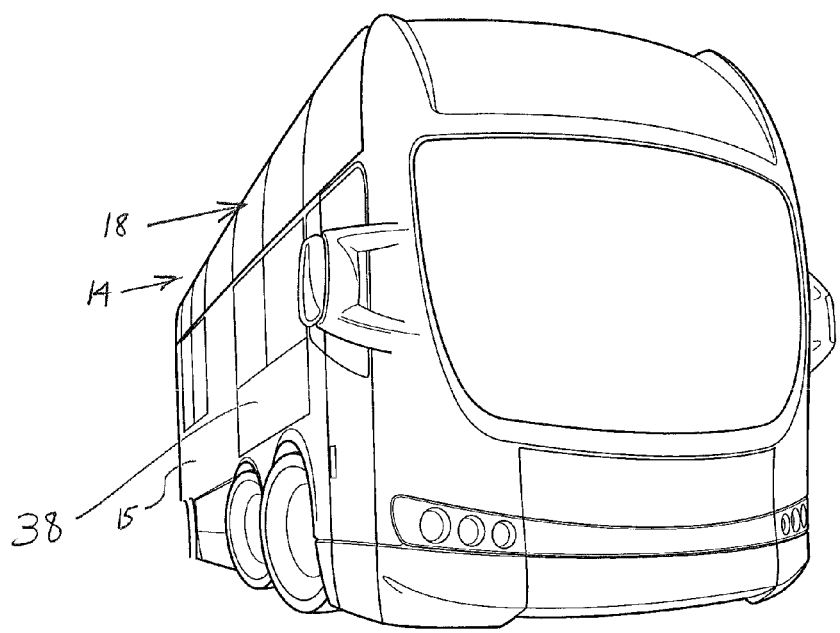
FIG. 13 is a perspective view of the second embodiment of the motor home of this invention.
Figure 14:
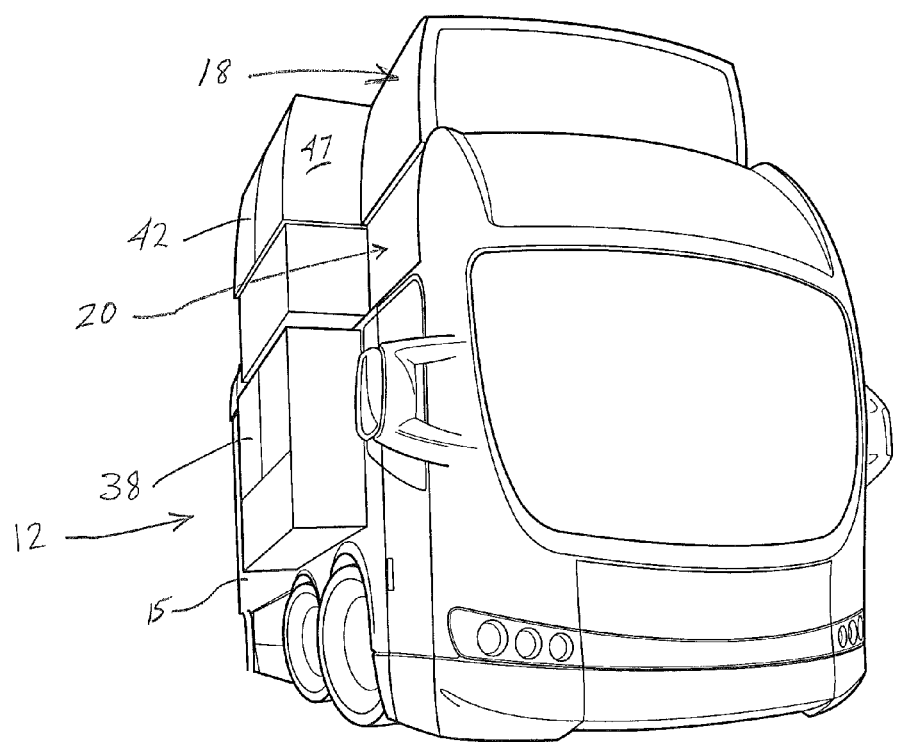
FIG. 14 is a perspective view of the motor home shown in FIG. 13 with the extendable rooms extended.
Figure 15:
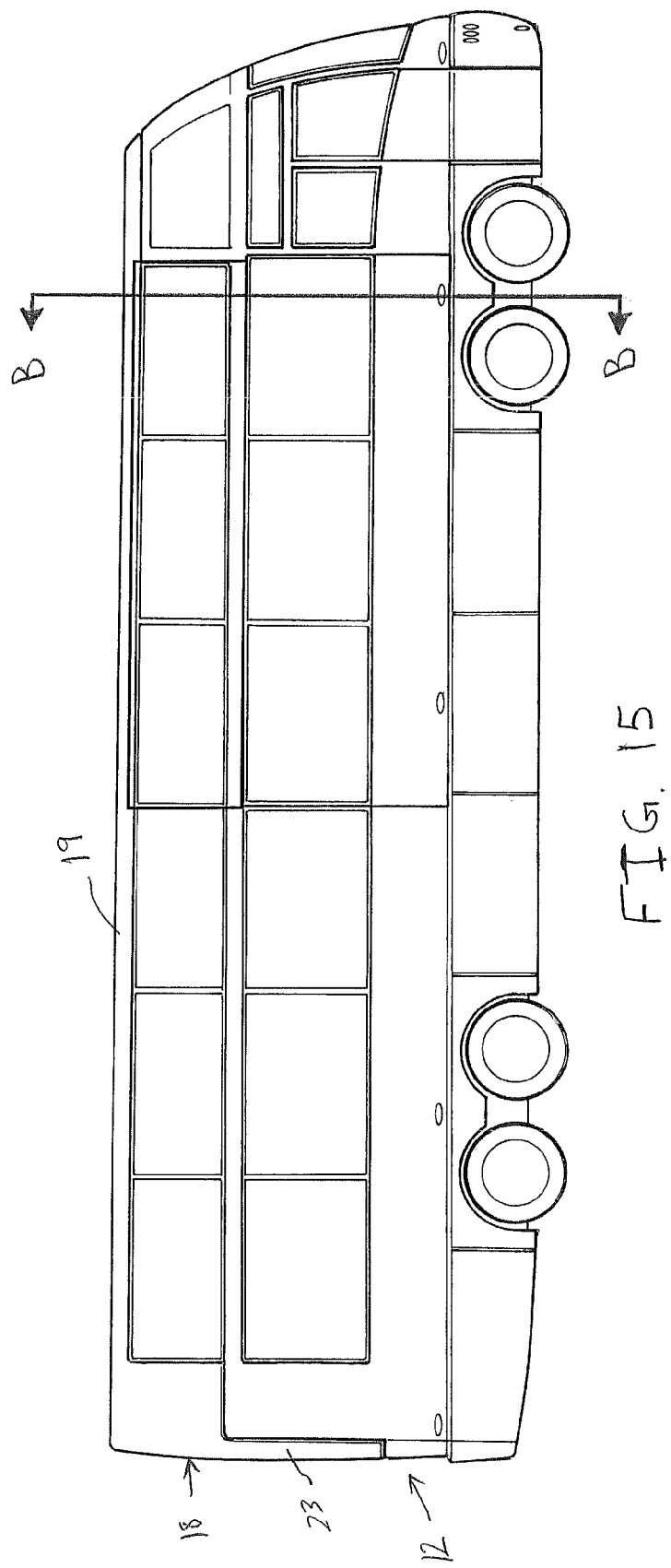
FIG. 15 is a side view of the motor home shown in FIG. 13.

The upper segment 18 and second floor 28 define an upper living area 41. FIGS. 1, 7, 8, and 11 show the upper segment 18 in its fully lowered position. The upper segment 18 overlaps the lower segment 20. The upper segment 18 is designed to be flush with the side wall 15 of the lower body portion 12 in its lowered position, which provides a streamlined surface. FIG. 11 shows in detail how actuators are mounted in the first embodiment to raise the upper segment 18, and how actuators are mounted to extend the rooms 38. The two types of actuators shown in FIGS. 8, 10, 11, and 12 are screw drives 60 and hydraulic cylinders 40, but could be of many other types well know in the motor home art.

The side walls 25 of the upper segment 18 are in a side by side relationship with the side walls 30 of the lower segment 20 when the upper segment 18 is in its lowered position. This relationship is shown in FIG. 8. When using hydraulic cylinders 17 to lift the upper segment 18, an upper end of the hydraulic cylinder 17 is mounted to the roof 19 and a lower end of the hydraulic cylinder 17 is mounted to a stationary location of the lower body portion. Fluid is supplied to the hydraulic cylinders 17 which lifts the upper segment 18. As the upper segment 18 raises, the side walls 25 move past the stationary sidewalls 30 in a telescoping manner. When the top is fully raised, as shown in FIGS. 10 and 11, there is some overlapping that provides a sealed upper living area 41.

The extendable rooms 38 slide between extended and retracted positions within the side walls 15 of the lower body portion 12. When hydraulic cylinders are used to move the rooms 38, the hydraulic cylinders 40 are attached at a stationary point on the floor 13 of the lower body portion and also attached to the floor 56 of the extendable room, as shown in FIG. 8. Fluid is supplied to the hydraulic cylinders 40 and the cylinders extend the room 38 as shown in FIG. 10. Fluid may also be supplied to an opposite end of the cylinder 40 to retract the room 38. When a screw drive 60 is used, a motor/gear box housing 52 is mounted to a stationary part of the side wall 25 and a threaded rod is mounted to the room 38. As the motor turns the threaded rod 50 is drawn through the housing 52, as is well known in the art. Depending on which way the motor turns the threaded rod 50 will either extend the room 38 or retract the room 38.

Second Embodiment

Figure 16:
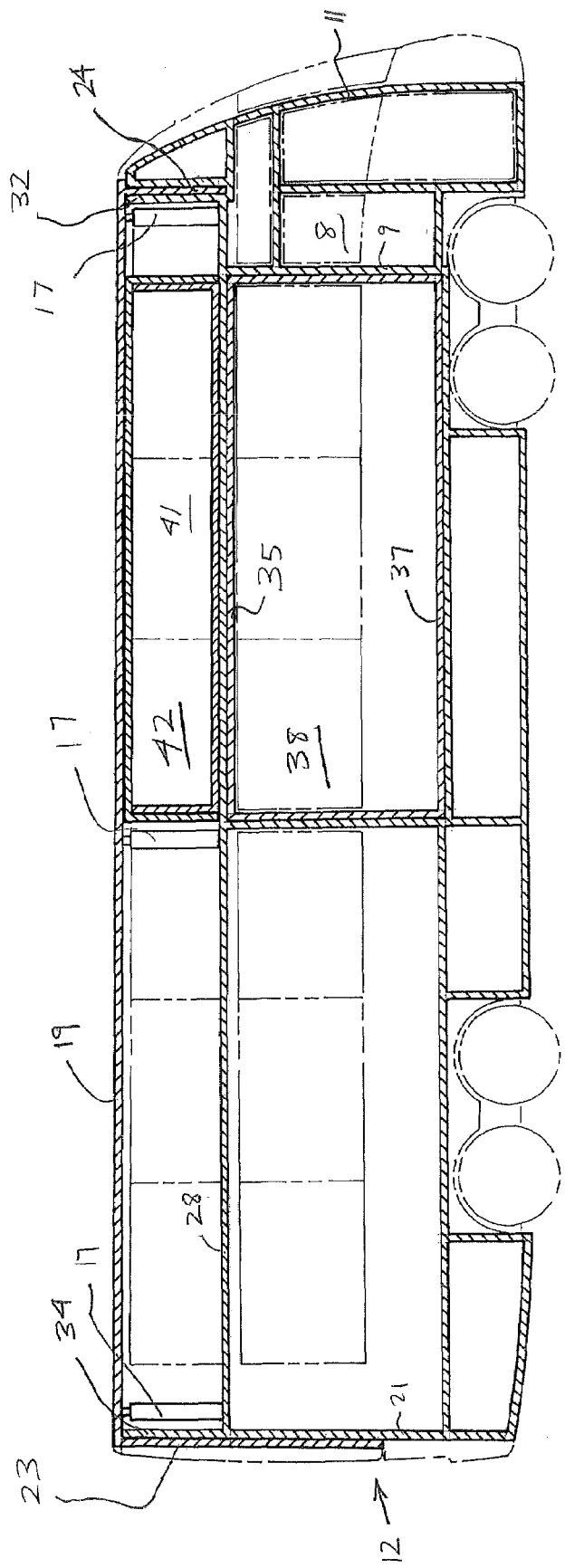
FIG. 16 is a sectional view through the side of the motor home shown in FIG. 15.
Figure 17:
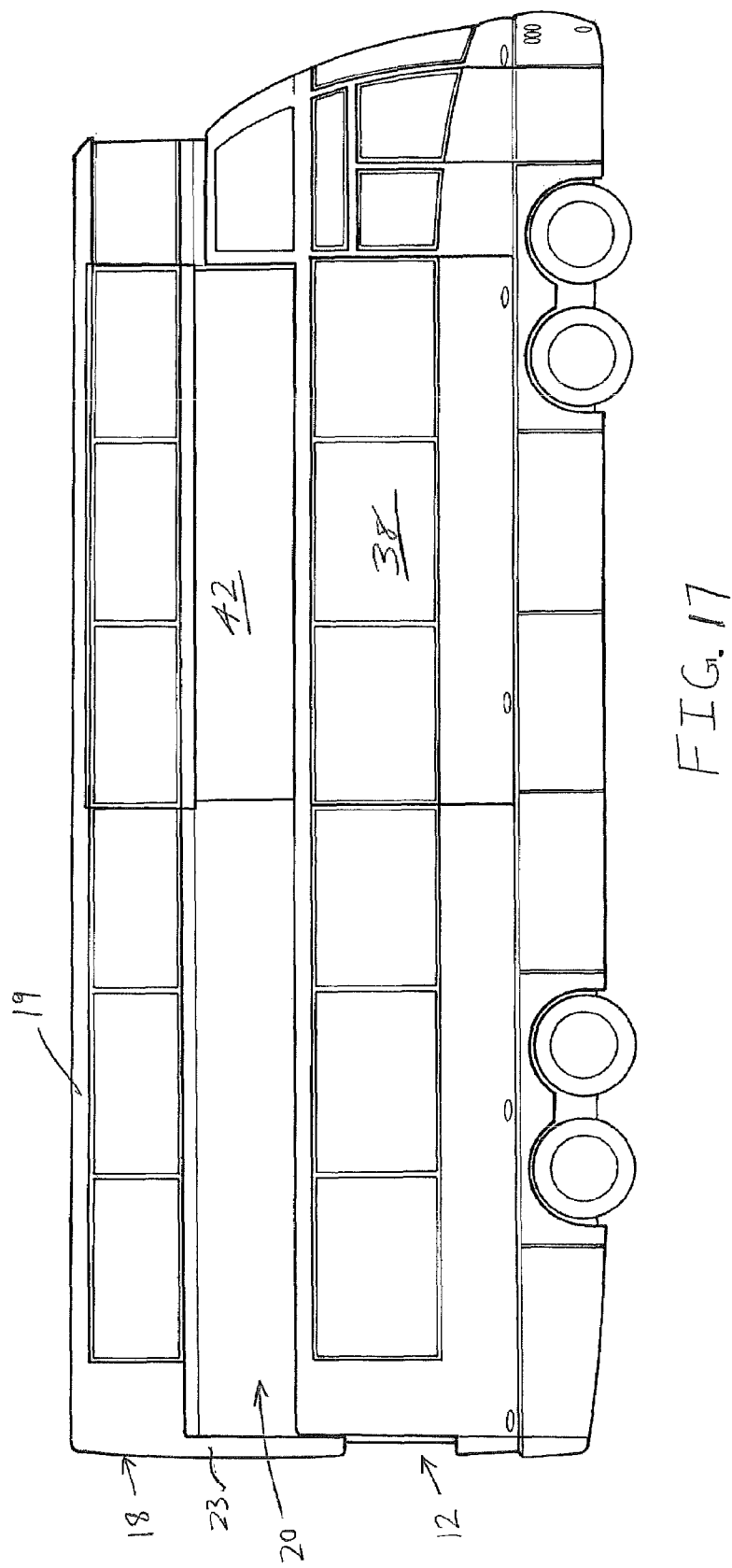
FIG. 17 is a side view of the motor home shown in FIG. 15 with the upper segment raised.
Figure 18:
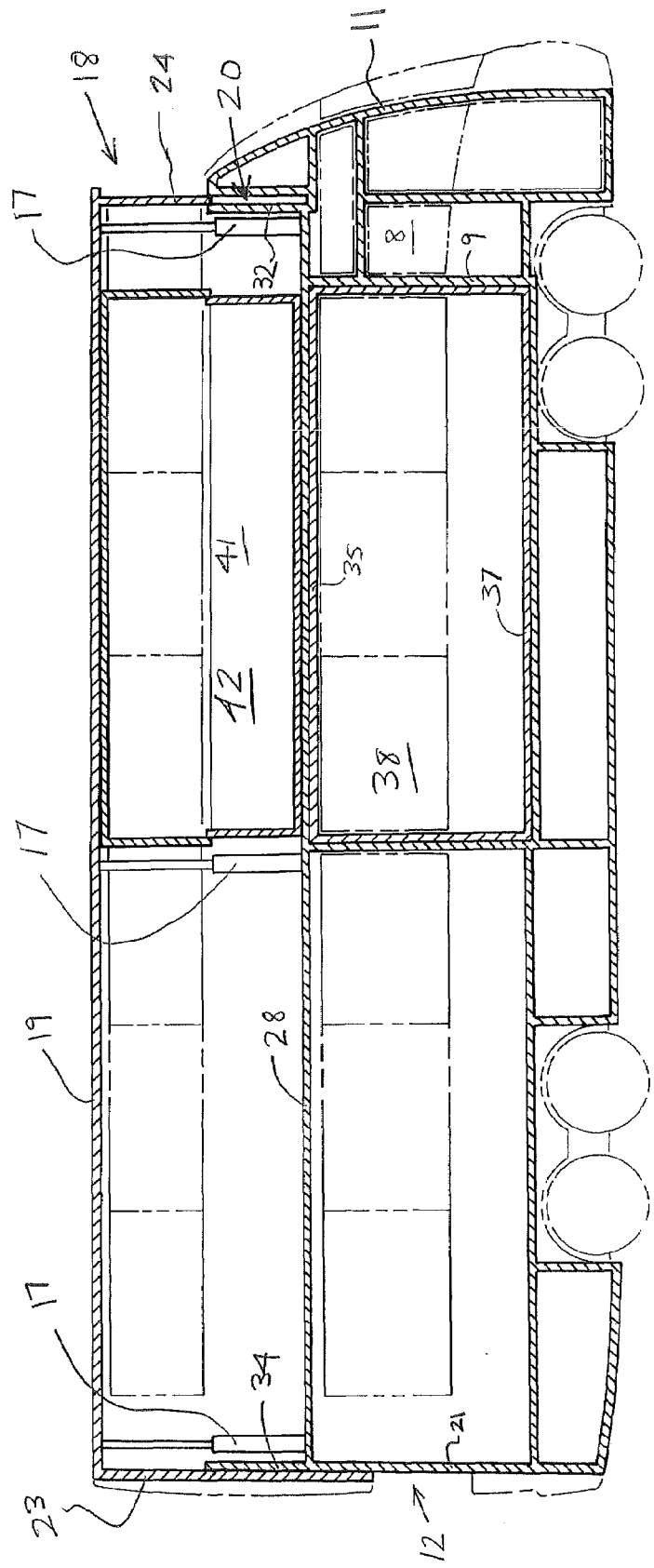
FIG. 18 is a sectional view of the motor home shown in FIG. 17 with the upper segment raised.
Figure 19:
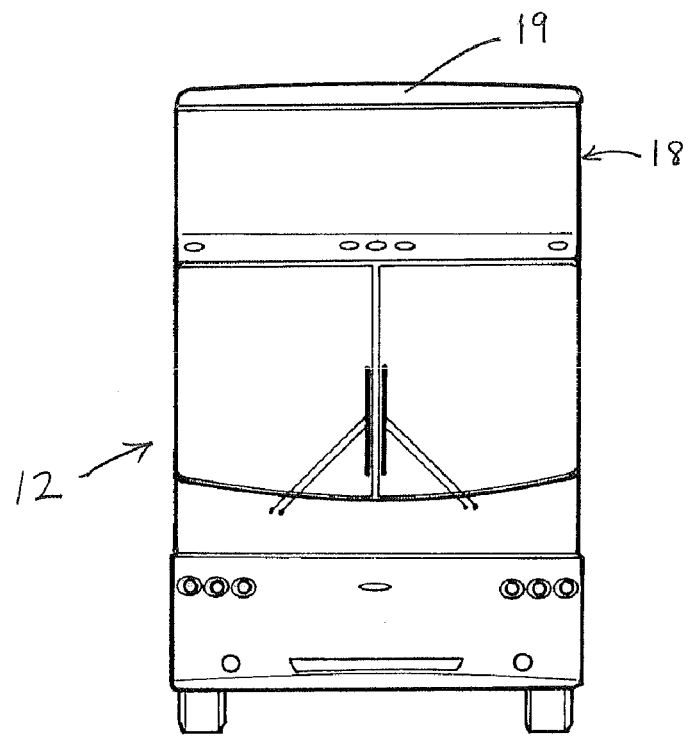
FIG. 19 is a front view of the motor home shown in FIG. 13.
Figure 20:
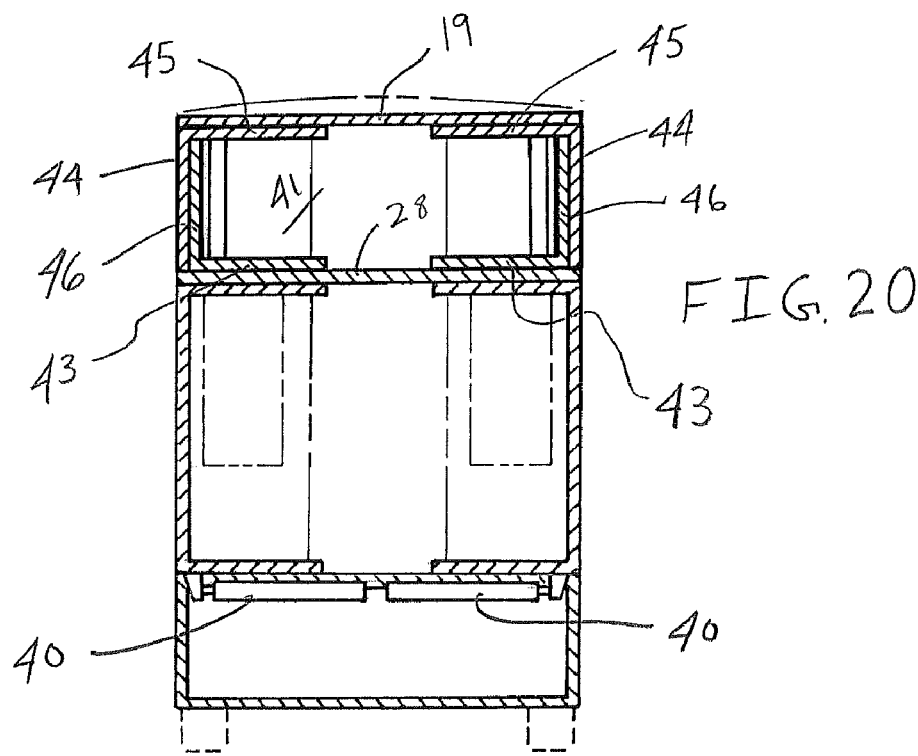
FIG. 20 is a sectional view of the motor home shown in FIG. 15 taken about the line B-B in FIG. 15.
Figure 21:
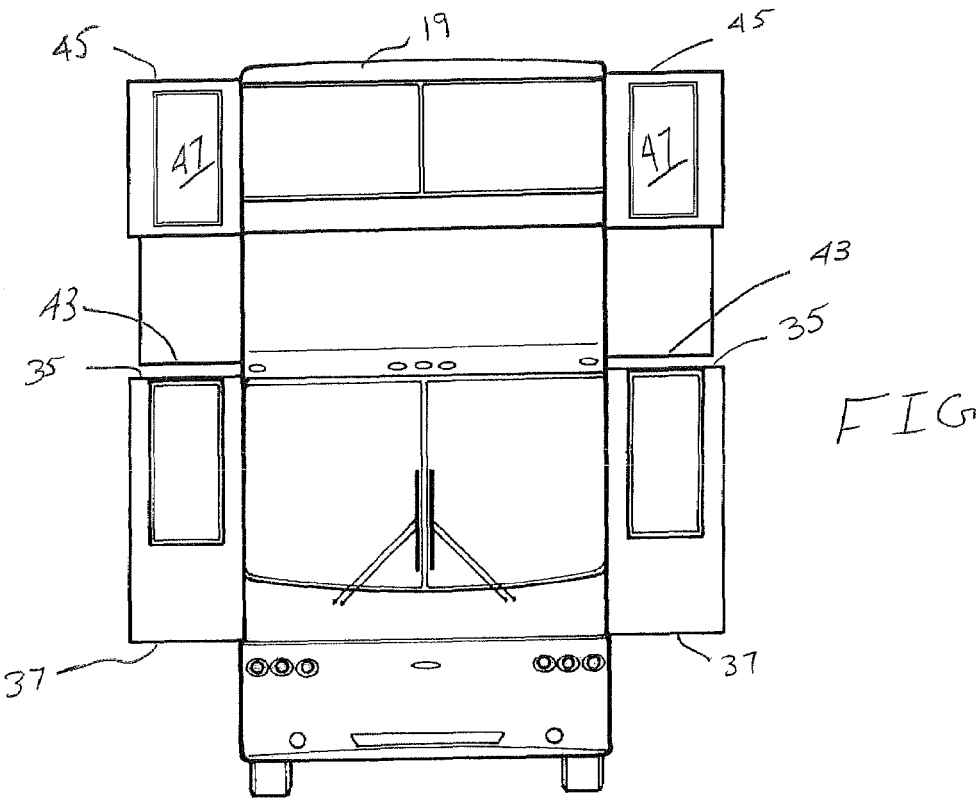
FIG. 21 is a front view of the motor home shown in FIG. 13 with all the extendable rooms extended and the upper segment in its raised position.
Figure 22:
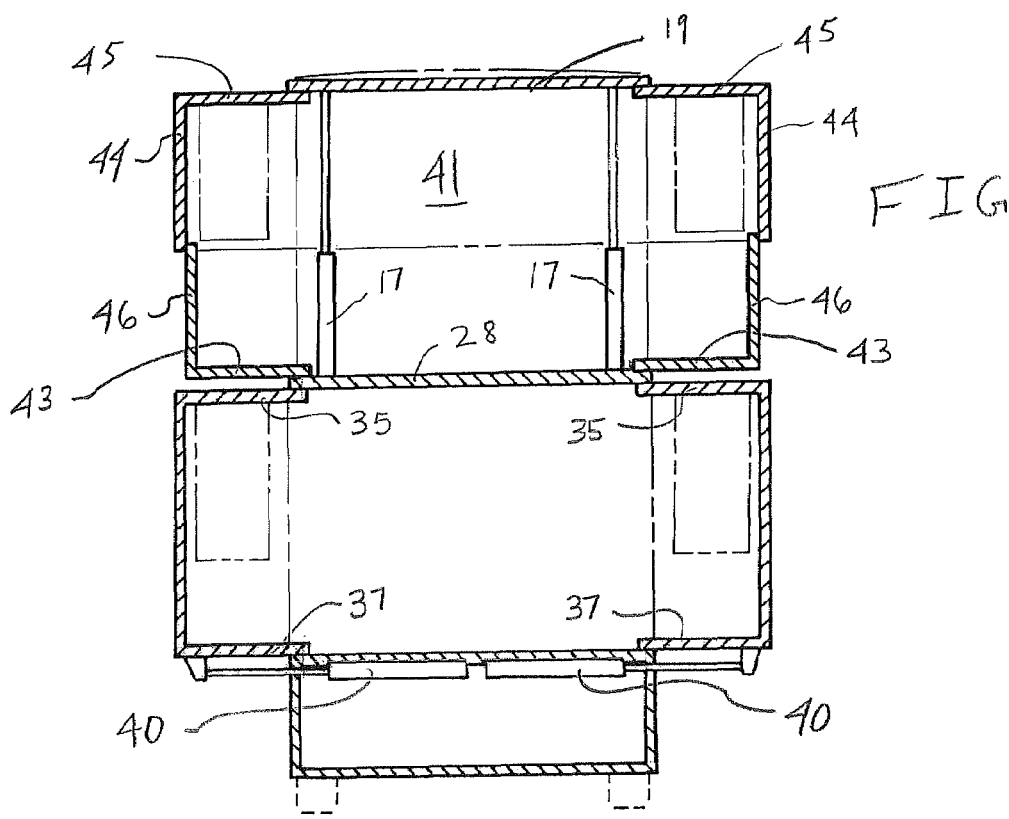
FIG. 22 is sectional view of the motor home taken about line B-B in FIG. 13.
Figure 23:
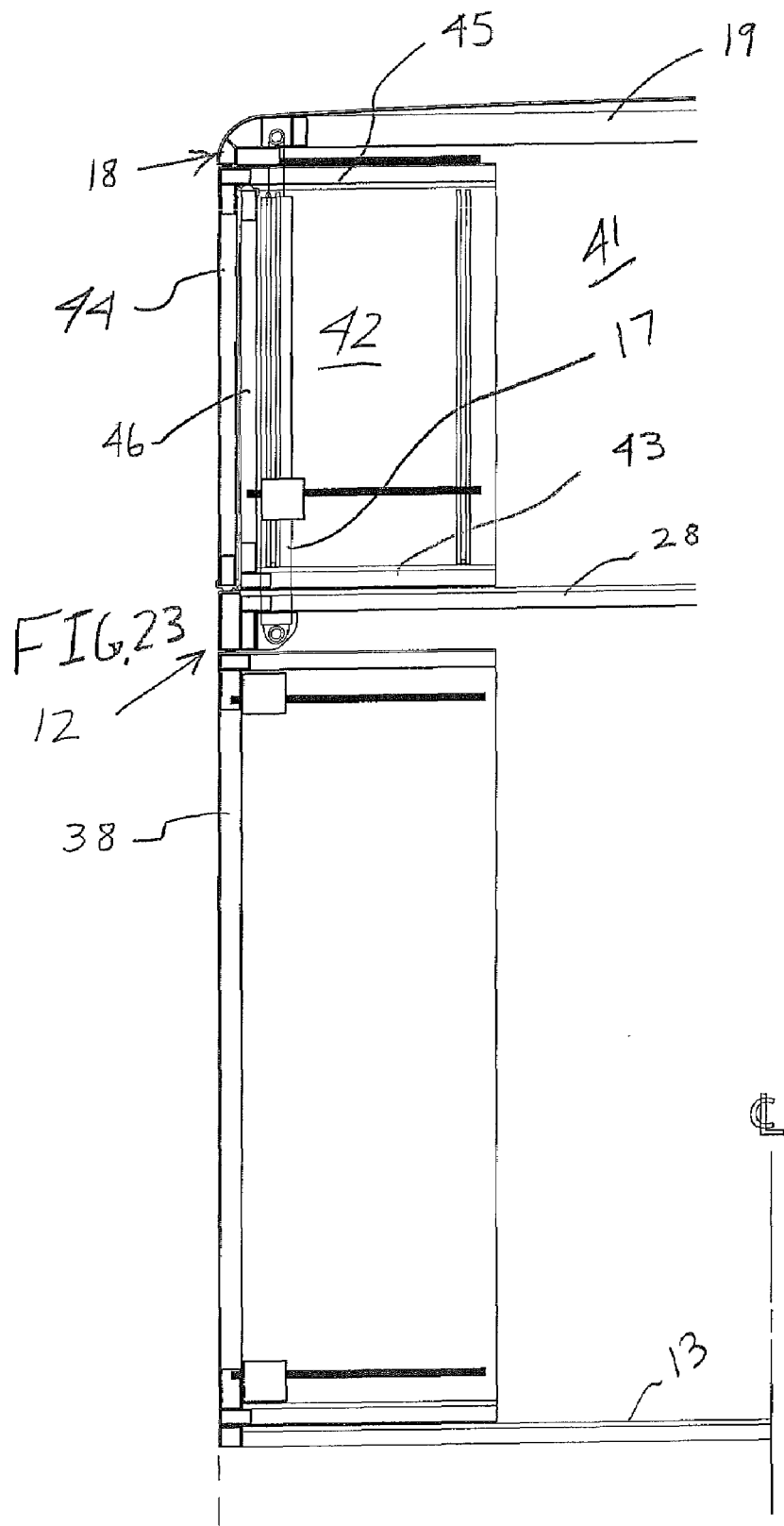
FIG. 23 is a detailed sectional view of the motor home taken about line B-B in FIG. 13 with the upper segment in its lowered position and all the extendable rooms retracted.
Figure 24:
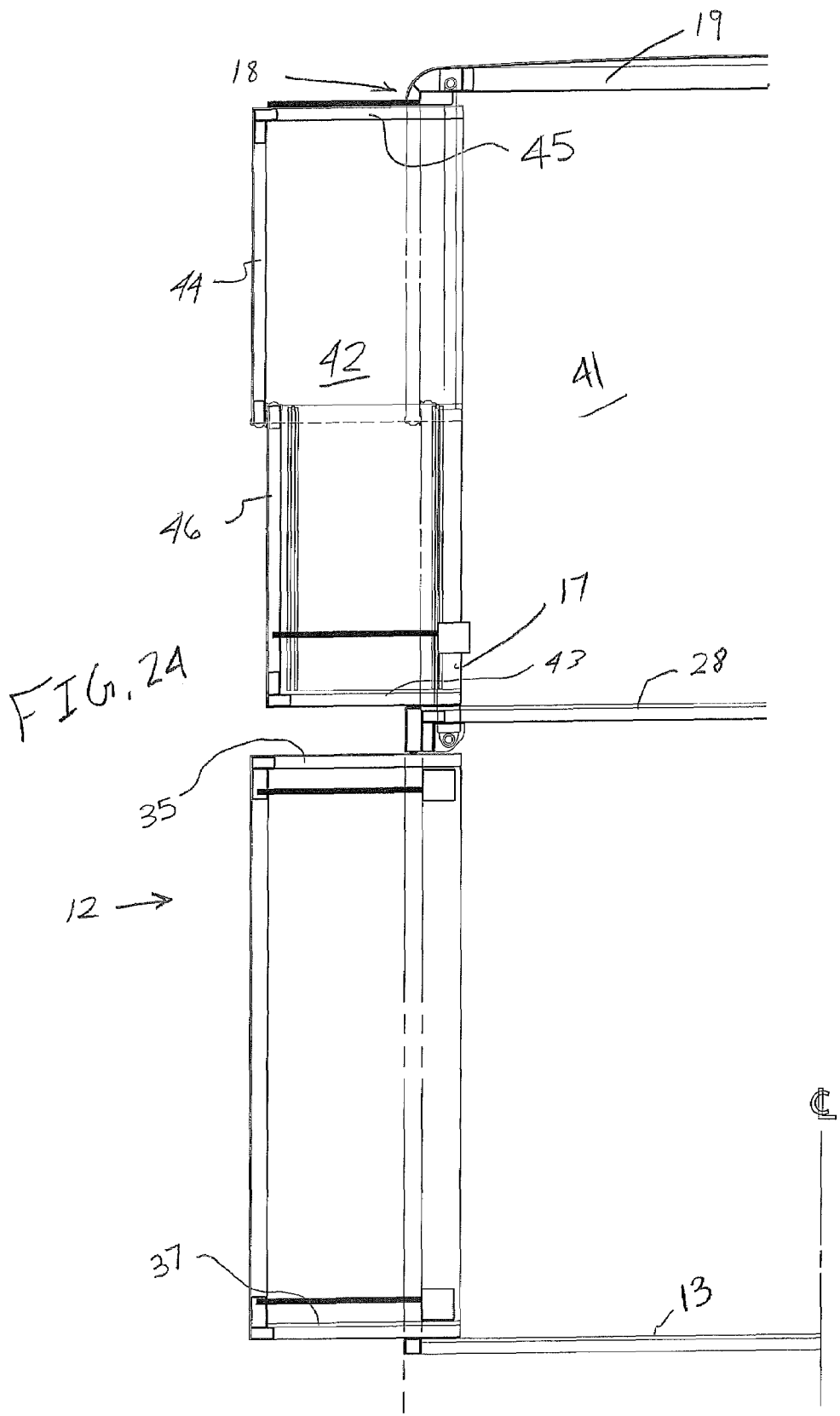
FIG. 24 is a detailed sectional view of the motor home taken about line B-B in FIG. 13 with the upper segment in its raised position and all the extendable rooms extended.
Figure 25:
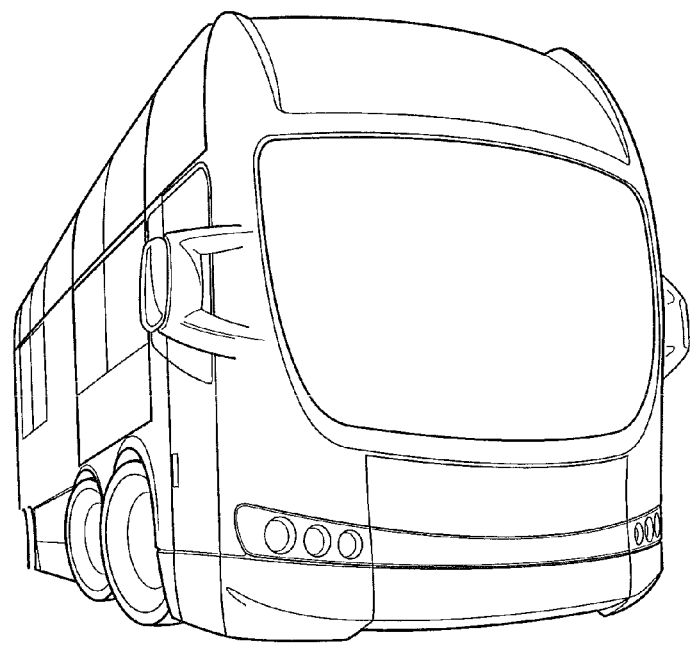
FIG. 25 is a perspective view of the third embodiment of the motor home of this invention.

In a second embodiment, as shown in FIGS. 13-24, the sidewalls 25 of the upper segment 18 contain upper extendable rooms 42. In this embodiment, the upper segment 18, extendable rooms 42 and second floor 28 define an upper living area 41. The upper extendable rooms 42 are slidably received in the upper body portion 14. The upper extendable rooms 42 have upper end walls 44 and lower end walls 46 that are in an overlapping, side by side relationship when the upper extendable rooms 42 are in their retracted positions, as shown in FIGS. 16 and 20. The lower end walls 46 are joined to floors 43 that slide over the second floor 28. The upper end walls 44 are joined to roofs 45 of the extendable rooms 42 that slide within the upper segment 18. Side walls 47 complete rooms 42. When the upper segment 18 is in its lowered position and the upper extendable rooms 42 are retracted, the walls 44 of the rooms 42 are flush with the side walls 15 of the lower body portion 12. The roofs 45 and upper end walls 44 are slidingly retained within the upper segment 18 so that when the upper segment 18 is raised the upper walls 44 of the upper extendable rooms 42 rise with the upper segment 18. The upper walls 44 slide past the lower end walls 46 in a telescoping manner as the extendable rooms 42 are moved from their lowered to raised positions along with the upper segment 18. When the upper segment 18 is in its fully raised position, the upper and lower walls 44, 46 remain in overlapping contact. After the upper segment 18 is in its raised position, the upper extendable rooms 42 are extended as shown in FIG. 22 and FIG. 24. As mentioned in the first embodiment, a screw drive 60 may be used to extend or retract each upper extendable room 42. The extendable rooms 38 are extendable independently of the upper extendable rooms 42. The floors 43 of the upper extendable rooms 42 are separate from the roofs 35 of the lower extendable rooms 38.

Third Embodiment

Figure 26:
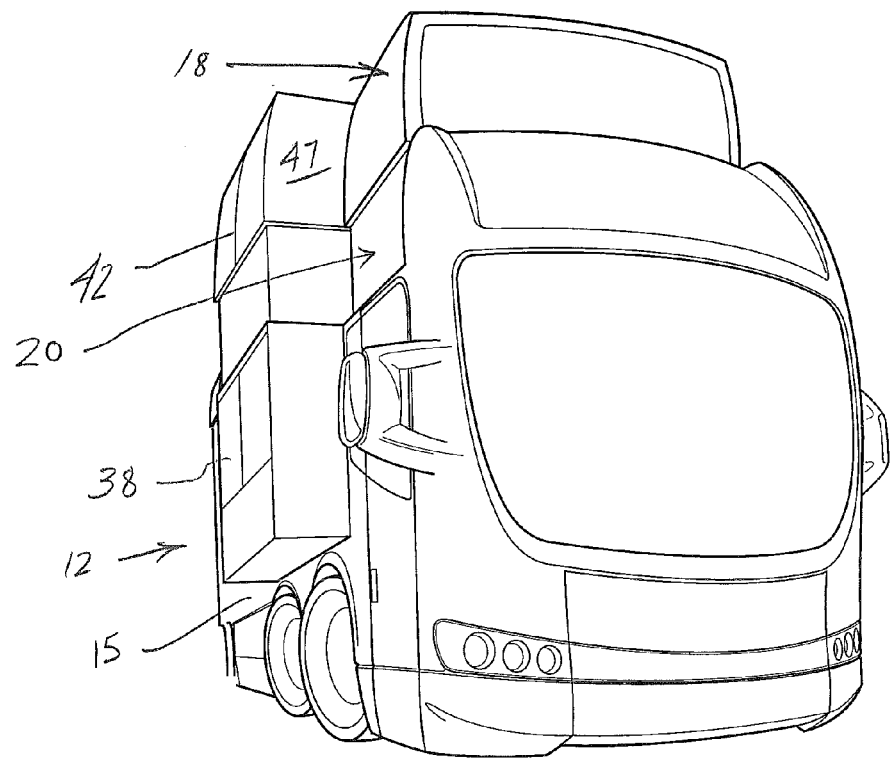
FIG. 26 is a perspective view of the motor home shown in FIG. 1 with the extendable rooms extended and the upper segment in its raised position.
Figure 27:
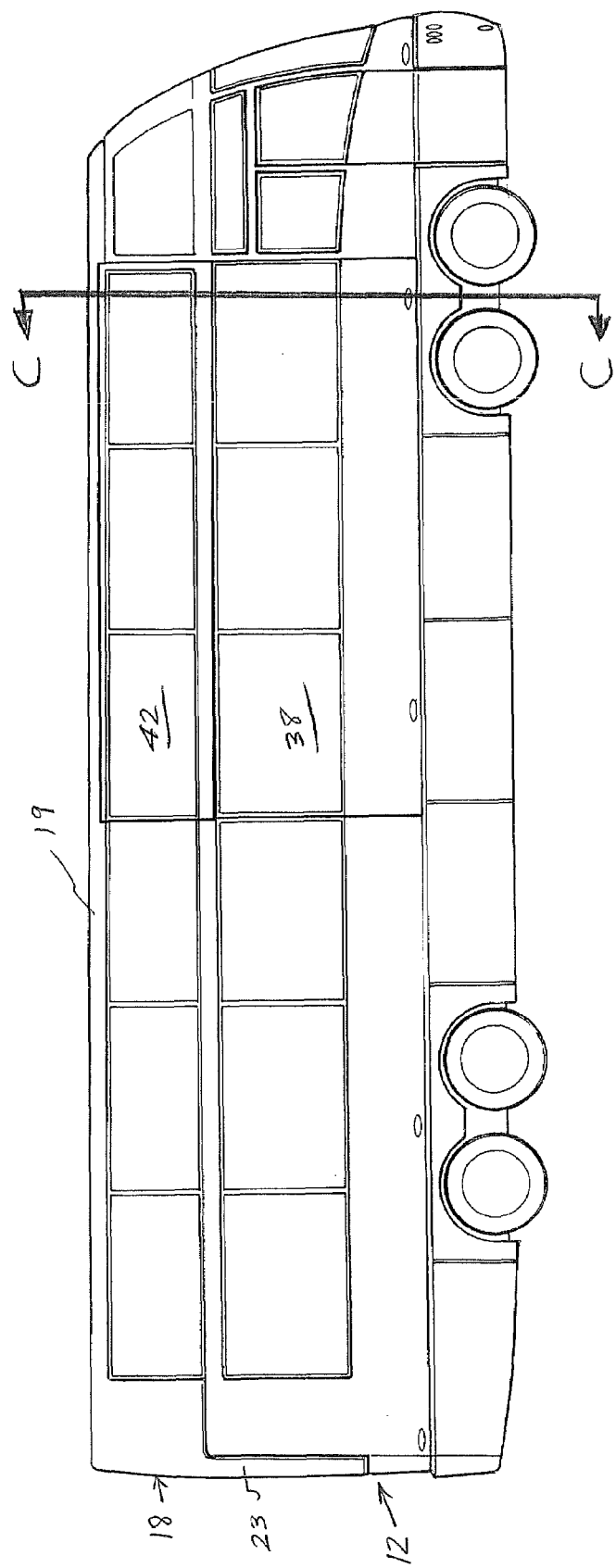
FIG. 27 is a side view of the motor home shown in FIG. 25.
Figure 28:
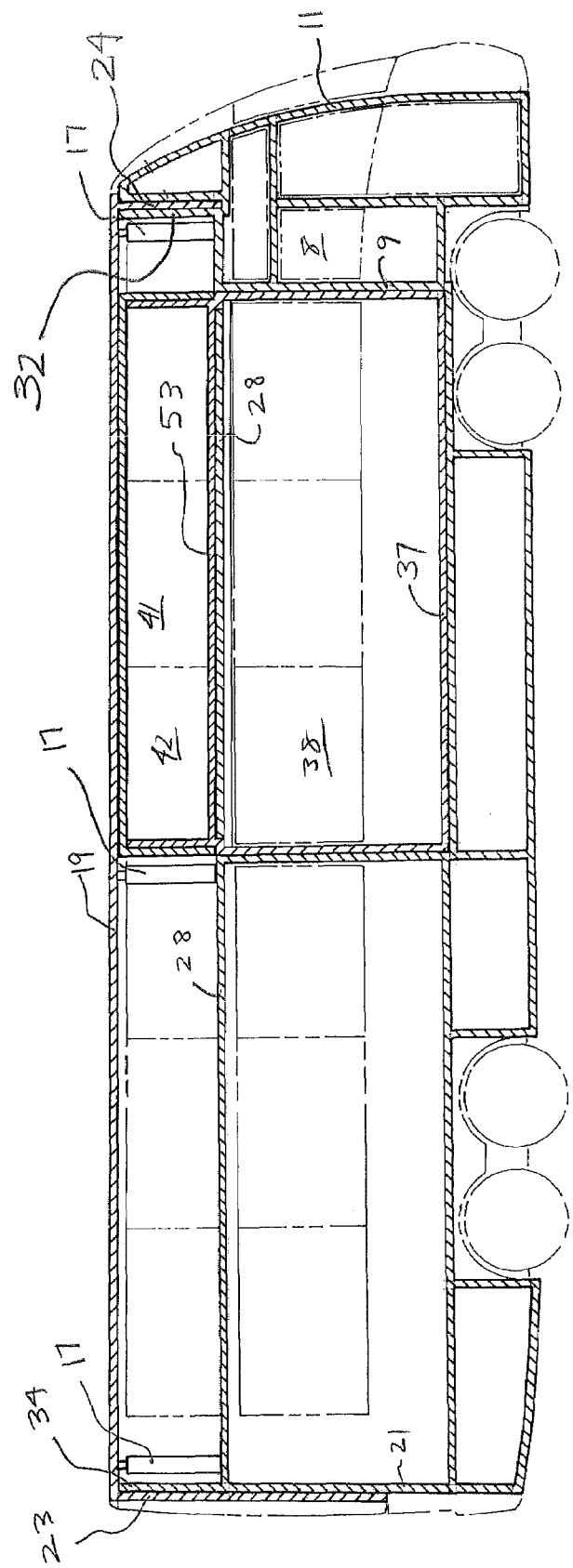
FIG. 28 is a sectional view through the side of the motor home shown in FIG. 27.
Figure 29:
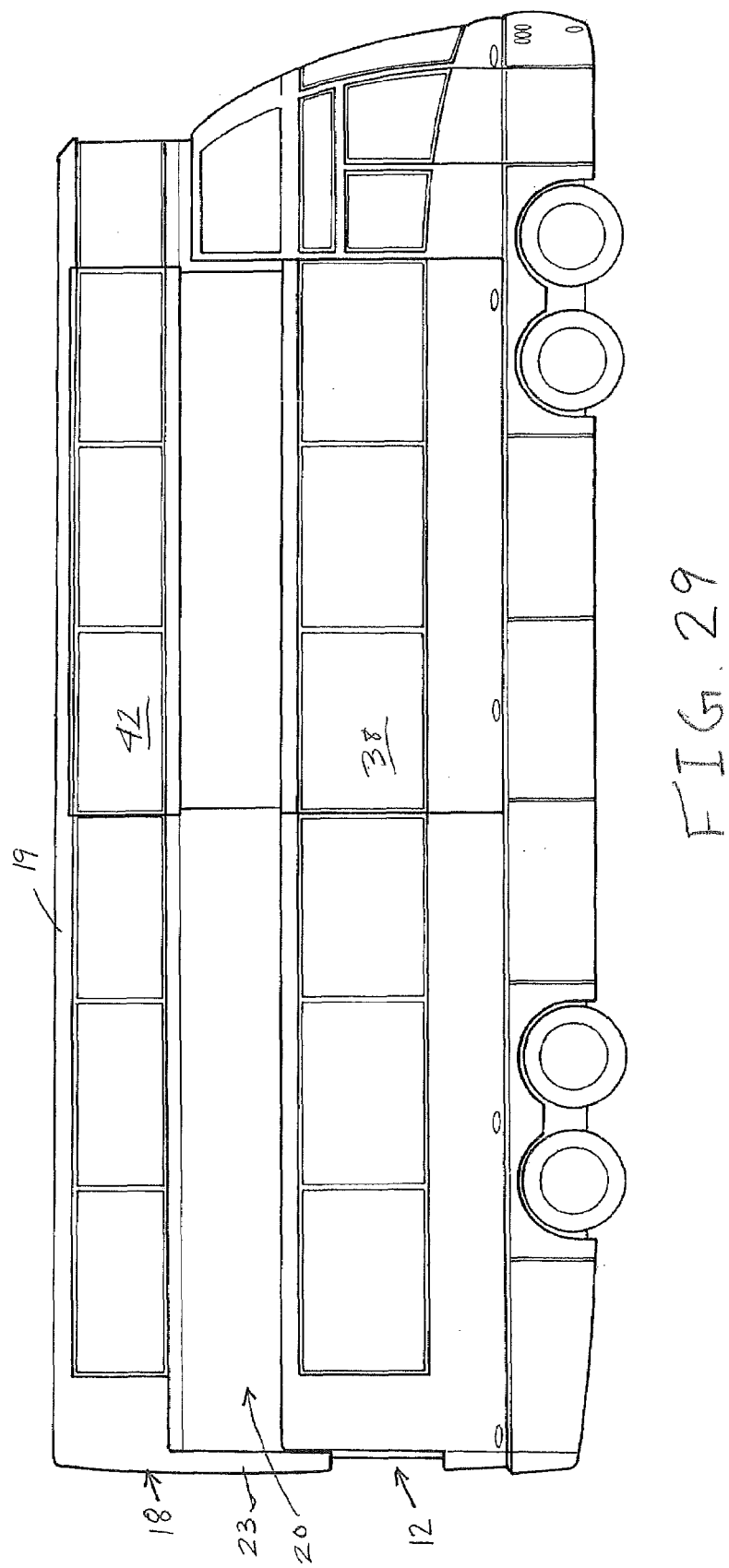
FIG. 29 is a side view of the motor home shown in FIG. 25 with the upper segment in its raised position.
Figure 30:
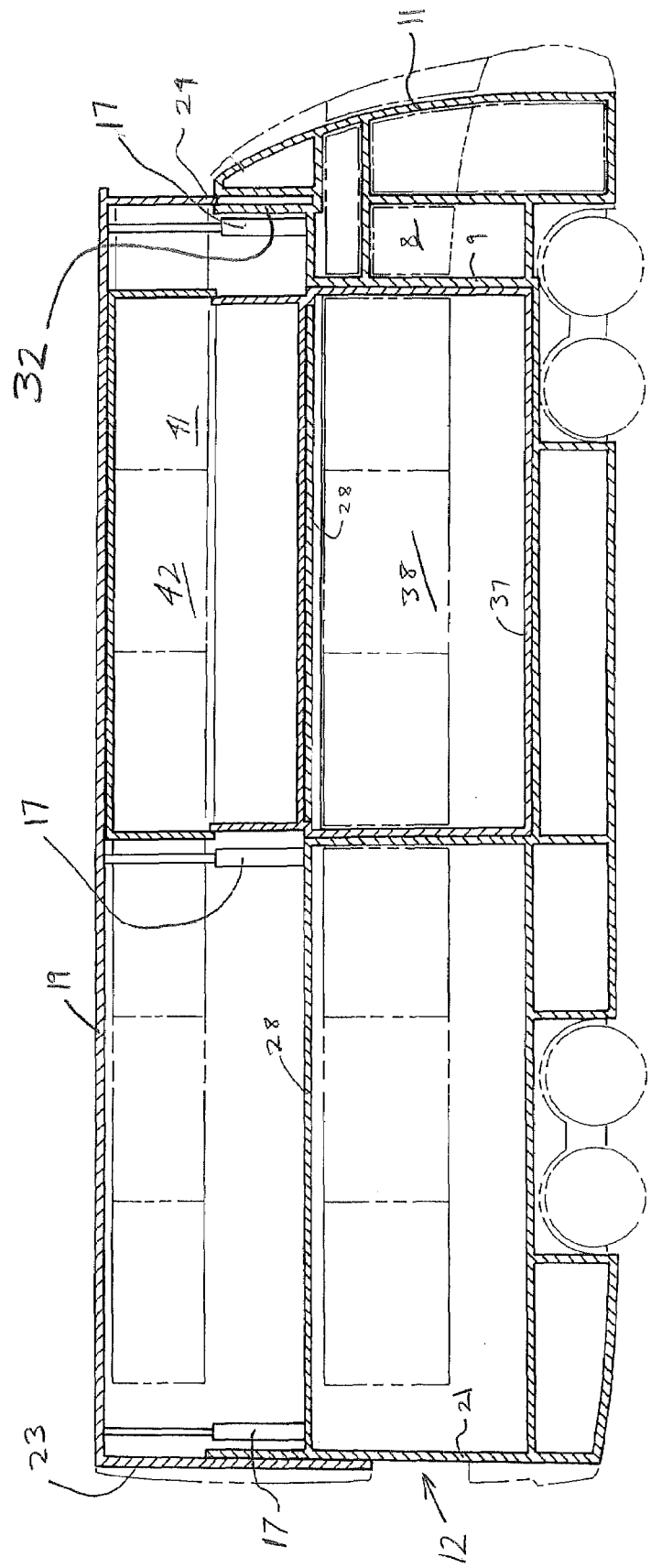
FIG. 30 is a sectional view of the motor home shown in FIG. 39 with the upper segment raised.
Figure 31:
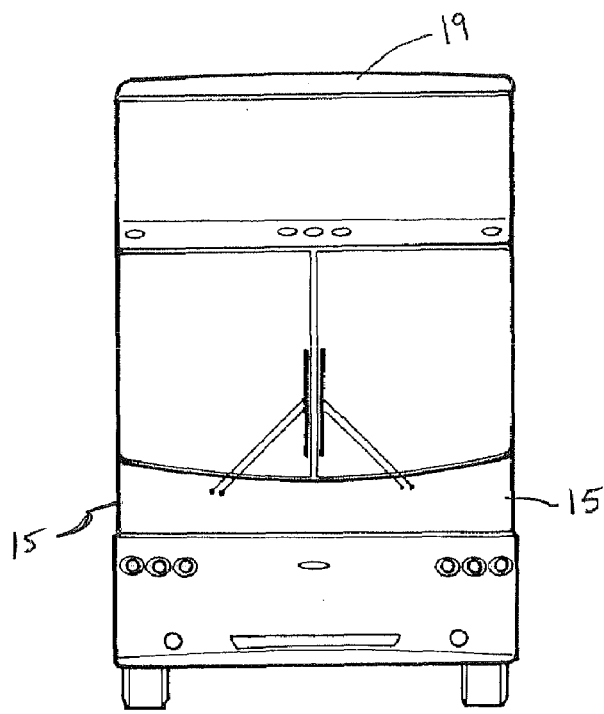
FIG. 31 is a front view of the motor home shown in FIG. 25.
Figure 32:
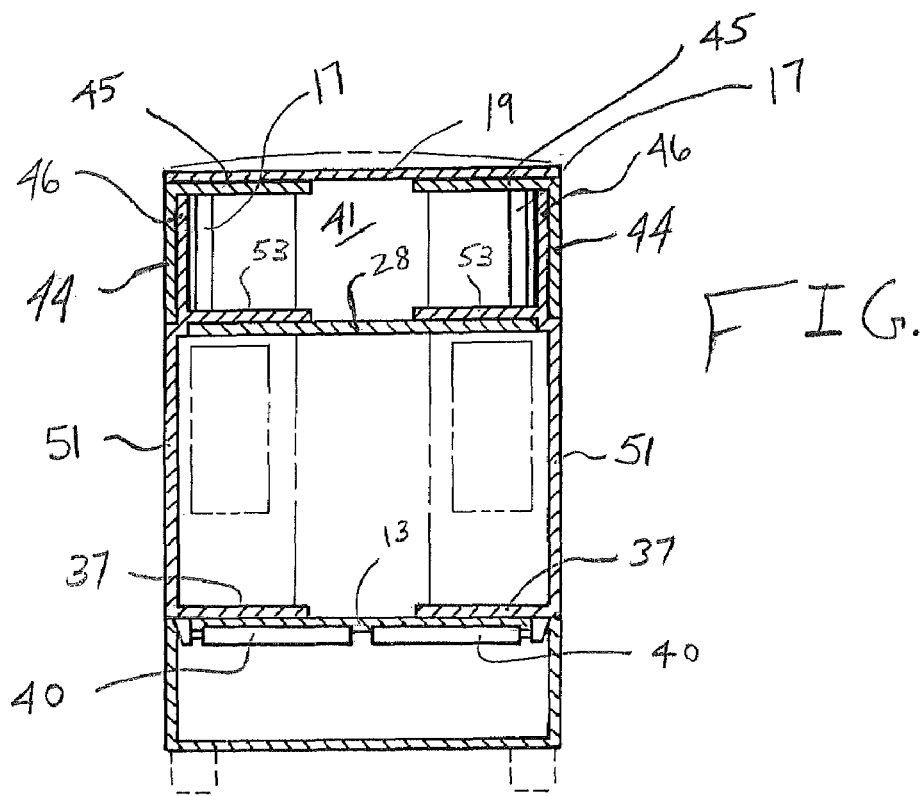
FIG. 32 is a sectional view of the motor home in FIG. 27 taken about the line C-C in FIG. 27.
Figure 33:
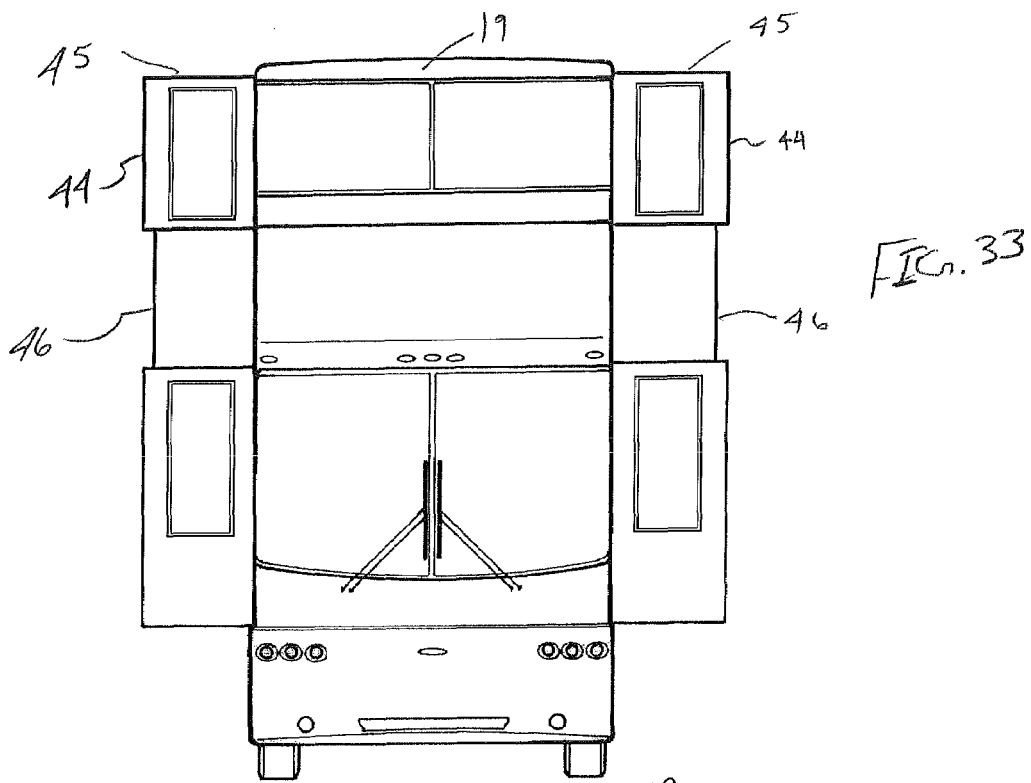
FIG. 33 is a front view of the motor home shown in FIG. 25 with all the extendable rooms extended and the upper segment in its raised position.
Figure 34:
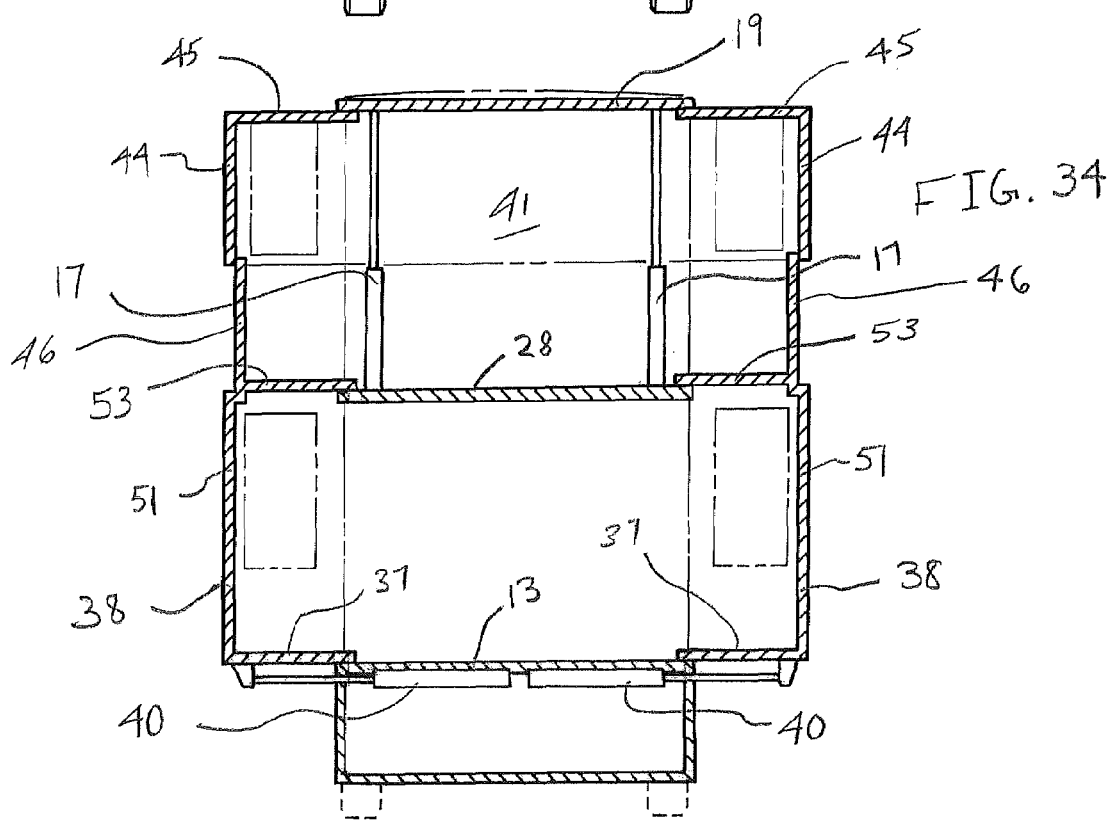
FIG. 34 is a sectional view of the motor home in FIG. 27 taken about the line C-C in FIG. 27 with all the extendable rooms extended and the upper segment in its raised position.
Figure 35:
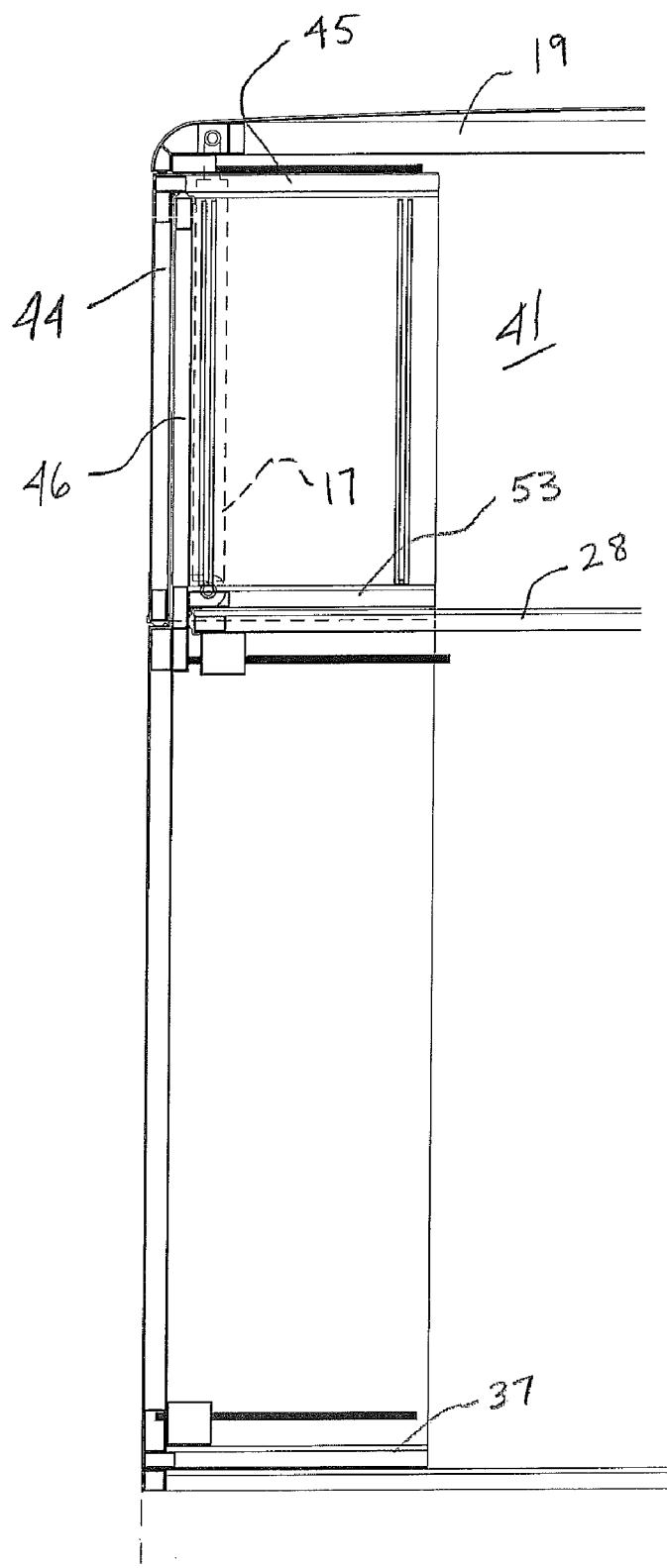
FIG. 35 is a detailed sectional view of the motor home taken about line C-C in FIG. 27 with the upper segment in its lowered position and all the extendable rooms retracted.
Figure 36:
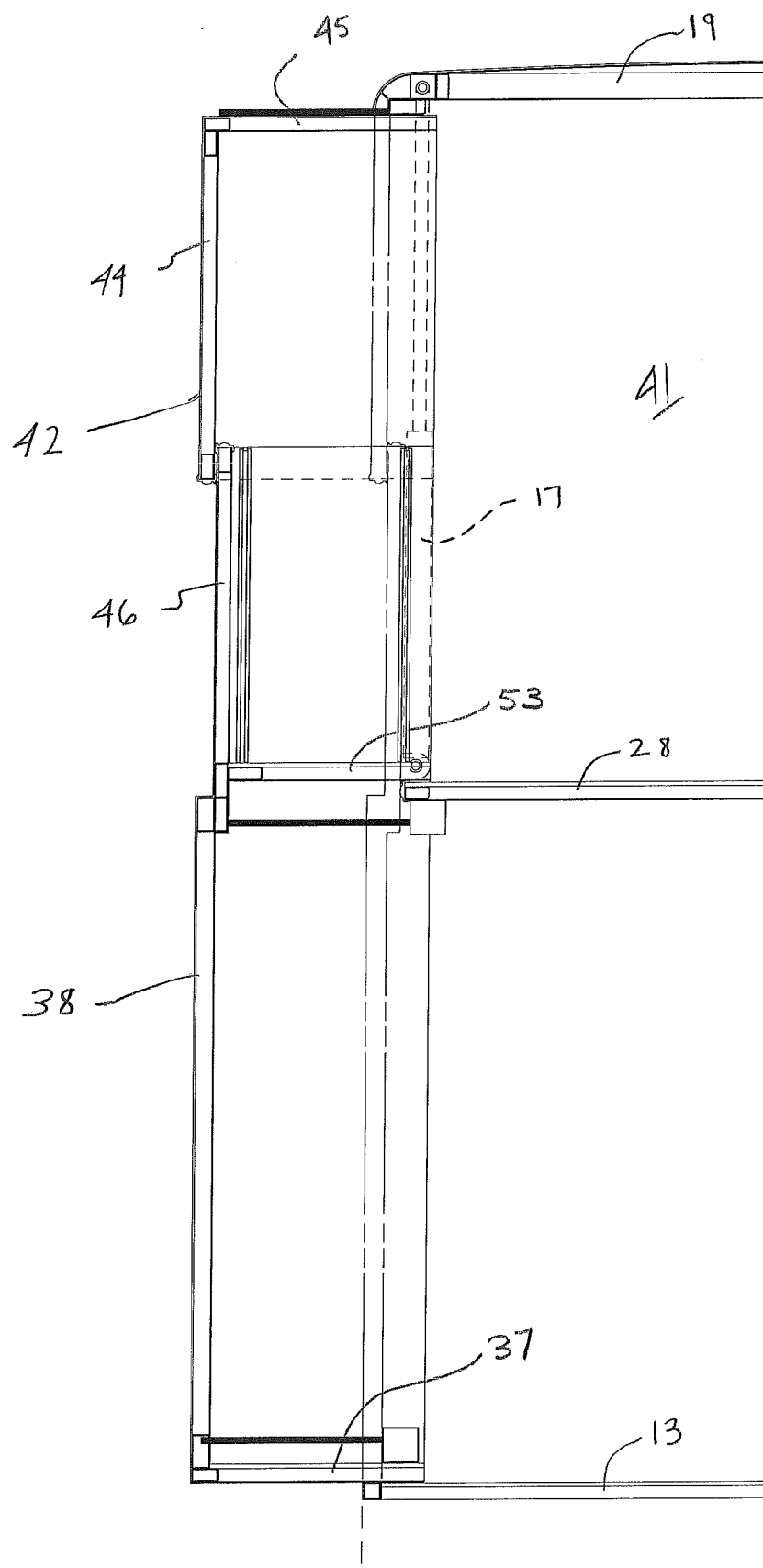
FIG. 36 is a detailed sectional view of the motor home taken about line C-C in FIG. 27 with the upper segment in its raised position and all the extendable rooms extended.
Figure 37:
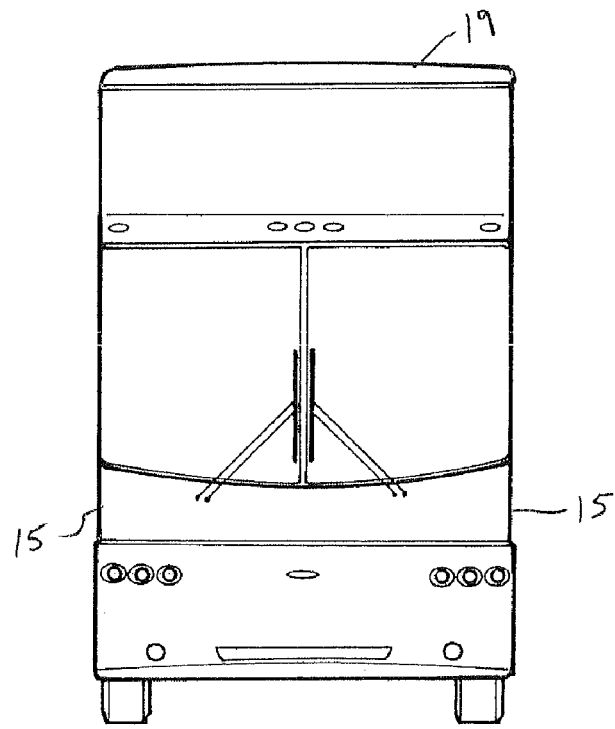
FIG. 37 is a front view of a fourth embodiment of the motor home of this invention.
Figure 38:
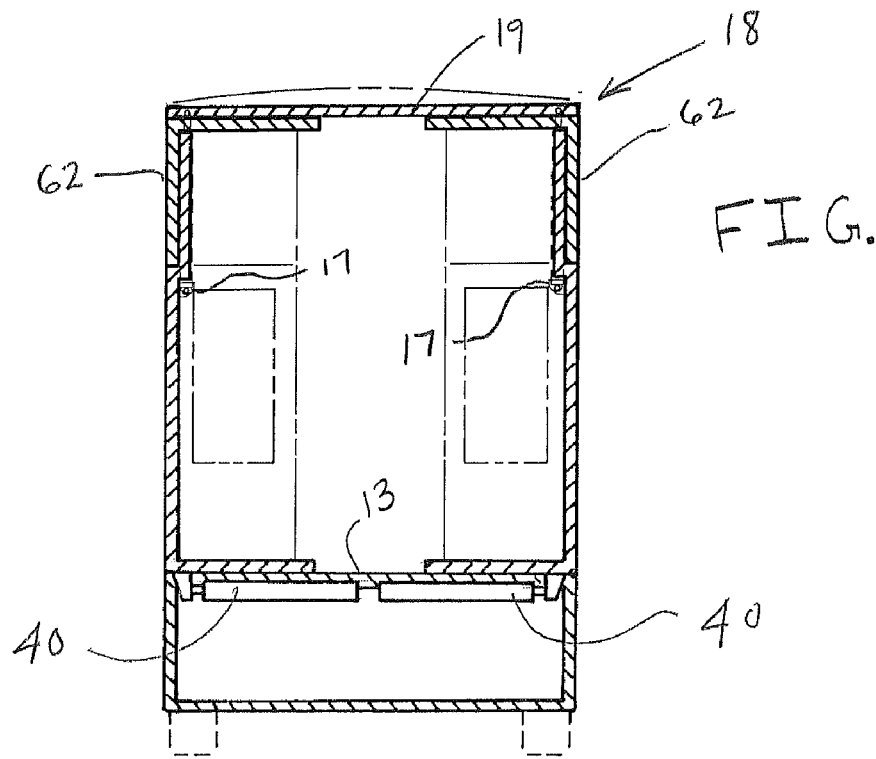
FIG. 38 is a sectional view of the motor home shown in FIG. 37 looking toward the rear of the motor home.
Figure 39:
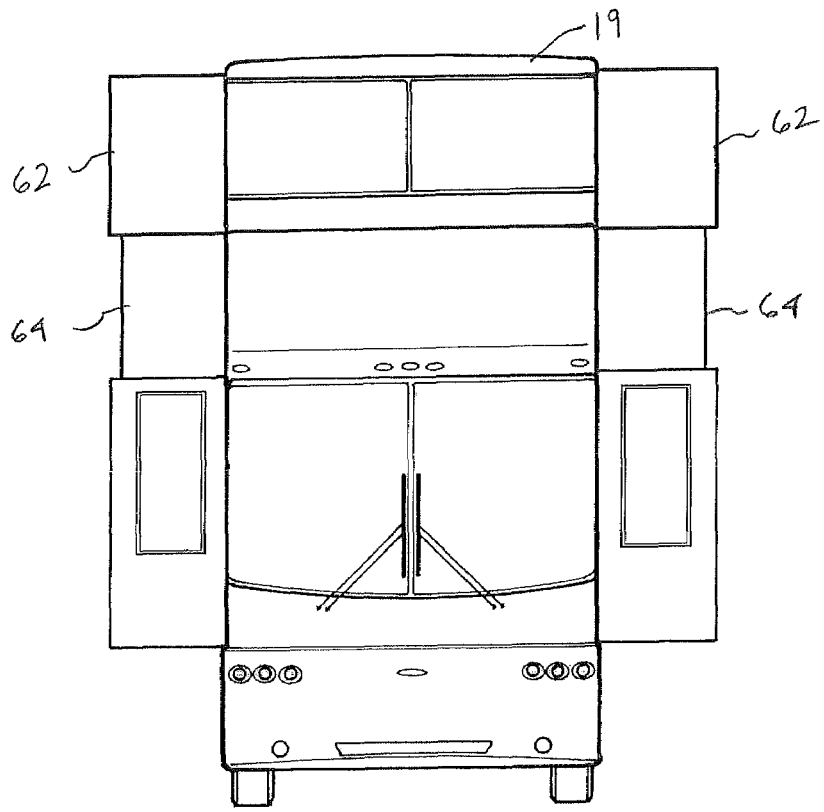
FIG. 39 is front view of the motor home shown in FIG. 37 with all the extendable rooms extended and the upper segment in its lowered position.

In a third embodiment, as shown in FIGS. 25-36, the sidewalls 25, 15 of the upper segment 18 and lower body portion 12 contain extendable rooms. The upper extendable rooms 42 and lower extendable rooms 38 are coordinated to extend simultaneously. As in the second embodiment, the upper extendable rooms 42 have an upper end wall 44 and a lower end wall 46 that are in an overlapping, side by side relationship when the upper extendable rooms 42 are in their retracted position, as shown in FIGS. 28 and 32. The lower end wall 46 of the upper extendable room 42 also forms a part of the wall 51 of the lower extendable room 38. A floor 53 of the upper extendable room 42 is attached where the lower end wall 46 and end wall 51 meet. The floor 53 of the upper extendable room 42 slides over the second floor 28. This is best shown in FIG. 34. When the upper segment 18 is in its lowered position, the upper extendable rooms 42 are in their retracted positions, and the lower extendable rooms 38 are also retracted, all of the extendable rooms 42, 38 are flush with the side walls 15 of the lower body portion 12. The roofs 45 and upper end walls 44 are slidingly retained within the upper segment 18 so that when the upper segment 18 is raised, the upper end walls 44 of the upper extendable rooms 42 rise with the upper segment 18. The upper end walls 44 slide past the lower end walls 46 in a telescoping manner as the extendable rooms 42 are moved from their lowered to raised position along with the upper segment 18. After the upper segment 18 is in its raised position, the upper extendable rooms 42 and lower extendable rooms 38 are extended as shown in FIGS. 26 and 34.

Fourth Embodiment

Figure 40:
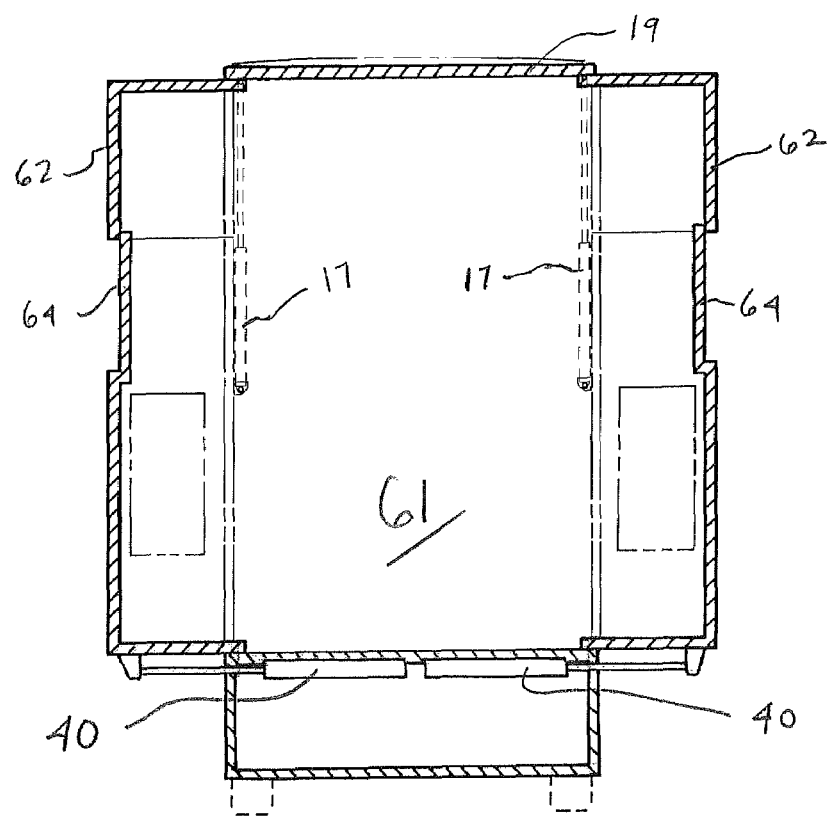
FIG. 40 is a sectional view of the motor home shown in FIG. 37 with all the extendable rooms extended and the upper segment in its raised position.
Figure 41:
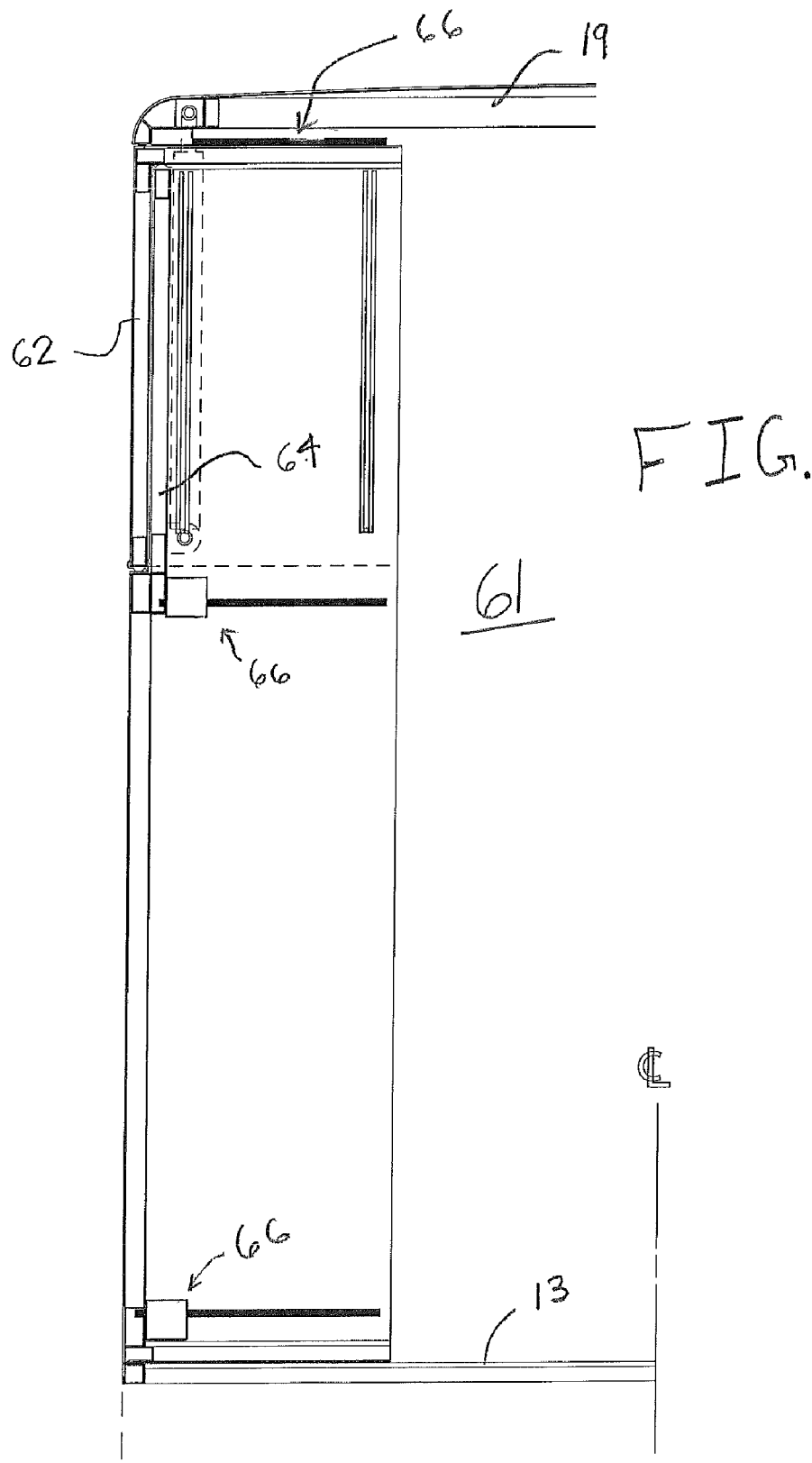
FIG. 41 is a detailed sectional view of the motor home shown in FIG. 37 looking toward the rear of the vehicle with the upper segment in its lowered position and the extendable rooms retracted.
Figure 42:
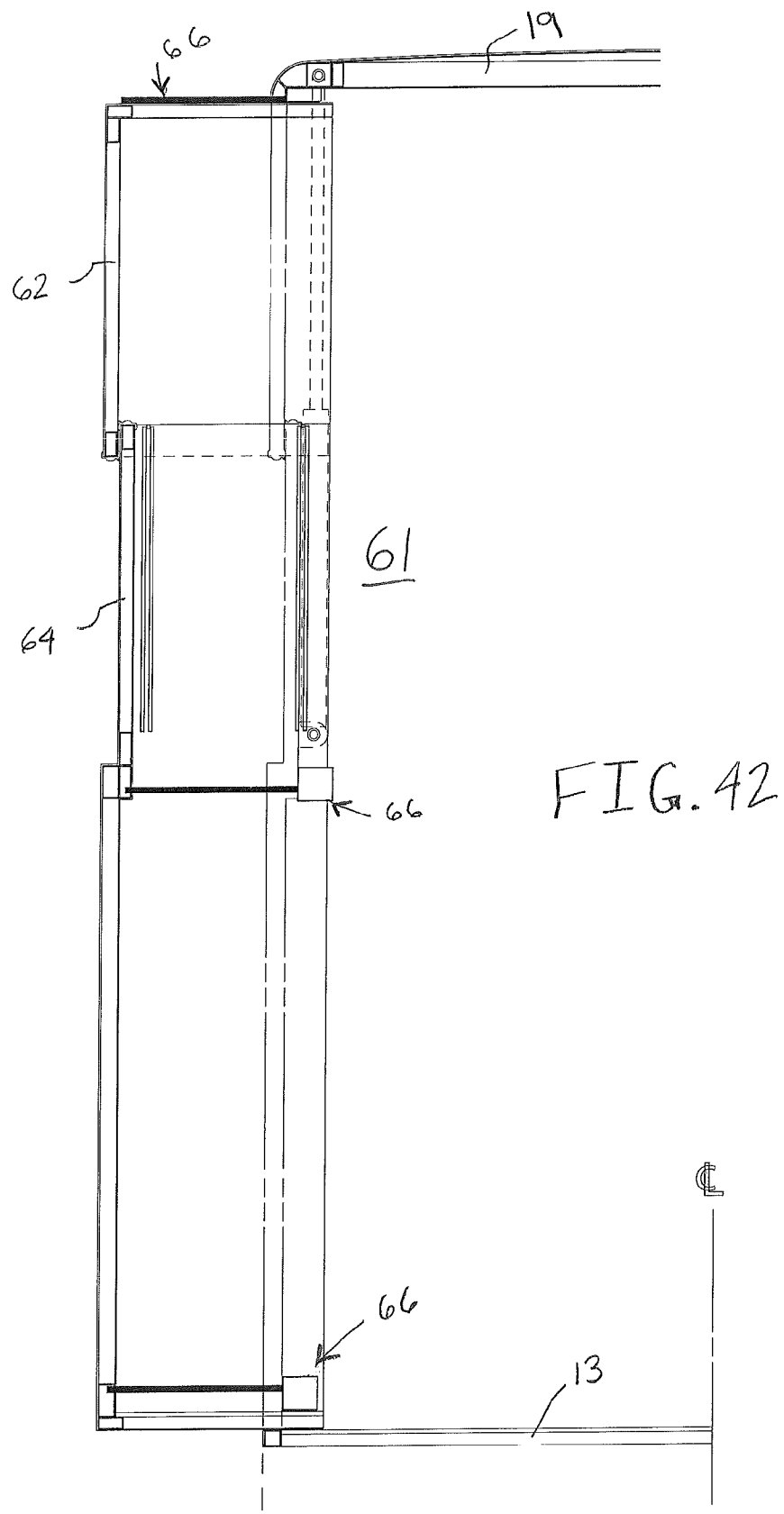
FIG. 42 is a sectional view of the motor home shown in FIG. 37 looking toward the rear of the vehicle with the upper segment in its raised position and the extendable rooms extended.

In a fourth embodiment, as shown in FIGS. 37-42, the extendable room 38 in the lower body portion 12 and the upper expandable room 42 are joined together to form a large room 61. The large room 61 is defined by upper walls 62, lower walls 64, and the first floor 13. There is no second floor as in previous embodiments. This produces a large room, with a high ceiling that may be greatly expanded. The upper segment 18 is movable from a lowered to a raised position. The upper and lower walls 62, 64 are in an overlapping, side by side relationship when the upper segment is in its lowered position. The upper walls 62 are slidably retained by the upper segment 18 such that when the upper segment 18 is raised, the upper walls will be raised. Hydraulic cylinders 17 are attached between a stationary part of the lower body portion 12 and the roof 19, as shown in FIG. 40. When the room 60 is to be expanded, fluid is supplied to the hydraulic cylinders to raise the upper segment 18. Once the upper segment 18 is raised, hydraulic cylinders 40 may be used to expand the room 60 laterally as shown in FIG. 40, or screw drives 66 may be used as shown in FIGS. 41 and 42.

The above described invention is not to be limited to the details given but may be modified within the scope of the following claims.

What is claimed is:

1. A motor home comprising:
    a lower body portion having a first floor, a front wall, a back wall and a pair of opposite side walls, wherein at least one of said side walls of said lower body portion accommodates an extendable room which provides additional interior space within said motor home, and an actuator for extending and retracting said extendable room;
    an upper body portion disposed over said lower body portion and having a movable upper segment and a fixed lower segment which is connected to said lower body portion, said lower segment interfacing within said upper segment, the lower segment having a front wall, a back wall and a pair of opposite side walls, and a second floor positioned between said roof of said upper segment and the first floor of said lower body portion, said upper segment having a front wall, a back wall and a pair of opposite side walls and a roof, said upper segment being shiftable relative to said lower segment such that said upper segment has a raised and lowered position relative to said lower segmented and said lower body portion, said front wall of said upper segment retracting above a cab of said motor home and behind a front most portion of said motor home so that no portion of said front wall of said upper segment remains exposed when said upper segment is in its lowered position; and
    an actuator for raising and lowering said upper segment relative to said lower segment.

2. The motor home as claimed in claim 1, wherein at least one of said side walls of said lower body portion accommodates an extendable room which provides additional interior space within said motor home, and an actuator for extending and retracting said extendable room.

3. The motor home as claimed in claim 1, wherein said side walls of said upper segment and said lower segment accommodates an extendable room which provides additional interior space within said motor home, and an actuator for extending and retracting said extendable room.

4. The motor home as claimed in claim 2, wherein said side walls of said upper segment and said lower segment accommodates an extendable room which provides additional interior space within said motor home, and an actuator for extending and retracting said extendable room of said upper segment and said lower segment.

5. The motor home as claimed in claim 3, wherein said extendable room within said lower body portion and said extendable room within said upper and lower segments are substantially vertically aligned.

6. The motor home as claimed in claim 5, wherein said extendable rooms of said lower body portion and said upper and lower segments are shiftable contemporaneously between extended and retracted positions.

7. The motor home as claimed in claim 4, wherein said extendable room within said lower body portion and said extendable room within said upper and lower segments are substantially vertically aligned.

8. The motor home as claimed in claim 7, wherein said extendable rooms of said lower body portion and said upper and lower segments are shiftable contemporaneously between extended and retracted positions.

9. The motor home as claimed in claim 8, wherein each said extendable room within said lower body portion is joined to each extendable room in said upper segment on the same side of said motor home to form a large undivided extendable room.

* * * * *